(12) United States Patent
Kurokawa

(10) Patent No.: US 8,009,050 B2
(45) Date of Patent: Aug. 30, 2011

(54) WIRELESS SYSTEM, SEMICONDUCTOR DEVICE, AND COMMUNICATION DEVICE

(75) Inventor: Yoshiyuki Kurokawa, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 402 days.

(21) Appl. No.: 12/010,789

(22) Filed: Jan. 30, 2008

(65) Prior Publication Data

US 2008/0186181 A1 Aug. 7, 2008

(30) Foreign Application Priority Data

Feb. 2, 2007 (JP) ................................. 2007-024001

(51) Int. Cl.
 *G08B 13/14* (2006.01)
(52) U.S. Cl. ..................... 340/572.4; 340/508
(58) Field of Classification Search ............... 340/572.1, 340/572.4, 10.1, 508; 714/699, 746, 797, 714/799, 819, 820
See application file for complete search history.

(56) References Cited

U.S. PATENT DOCUMENTS

| | | | | |
|---|---|---|---|---|
| 4,209,783 A * | 6/1980 | Ohyama et al. | ............ | 340/10.42 |
| 4,751,478 A | 6/1988 | Yoshida | | |
| 5,661,470 A * | 8/1997 | Karr | ............ | 340/10.33 |
| 6,381,251 B1 | 4/2002 | Sano et al. | | |
| 6,865,699 B2 | 3/2005 | Tanaka et al. | | |
| 7,209,040 B2 | 4/2007 | Barink et al. | | |
| 7,366,465 B2 * | 4/2008 | Barink et al. | ............ | 340/572.1 |
| 7,457,442 B2 | 11/2008 | Mimura et al. | | |
| 7,783,581 B2 | 8/2010 | Hosoi et al. | | |
| 2004/0078101 A1 * | 4/2004 | Kondoh et al. | ............ | 700/79 |
| 2004/0164302 A1 | 8/2004 | Arai et al. | | |
| 2005/0130389 A1 | 6/2005 | Yamazaki et al. | | |
| 2007/0030143 A1 * | 2/2007 | Benson et al. | ............ | 340/508 |
| 2007/0063920 A1 | 3/2007 | Shionoiri et al. | | |
| 2007/0252208 A1 | 11/2007 | Koyama et al. | | |
| 2008/0186182 A1 | 8/2008 | Kurokawa | | |

FOREIGN PATENT DOCUMENTS

| | | |
|---|---|---|
| JP | 2000-149194 | 5/2000 |
| JP | 2003-067683 A | 3/2003 |

OTHER PUBLICATIONS

"Sense of Crisis" is a Trigger. Ignited Evolution of a Sesame-Grain Sized Chip, Technology Development is Entering into the Second Phase, Nikkei Electronics, Nov. 18, 2002, No. 835, pp. 67-76.
Chinese Office Action (Application No. 200810005777.1) Dated May 17, 2011.

* cited by examiner

*Primary Examiner* — Thomas J Mullen
(74) *Attorney, Agent, or Firm* — Eric J. Robinson; Robinson Intellectual Property Law Office, P.C.

(57) ABSTRACT

A highly reliable and inexpensive wireless system, which includes a communication device and a semiconductor device having a plurality of functional circuits with the same function, is provided. The semiconductor device transmits the processing results of the functional circuits to the communication device by a time-division system.

15 Claims, 13 Drawing Sheets

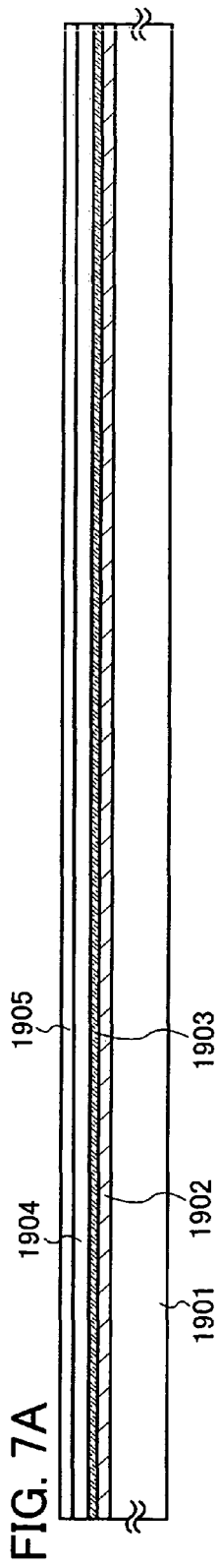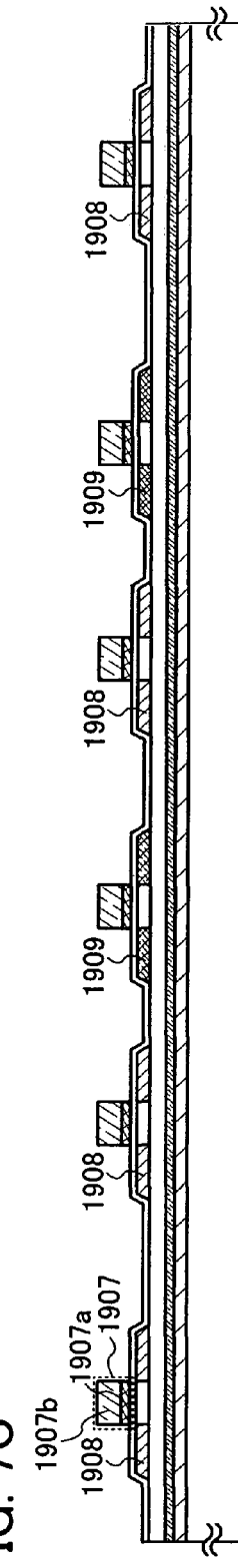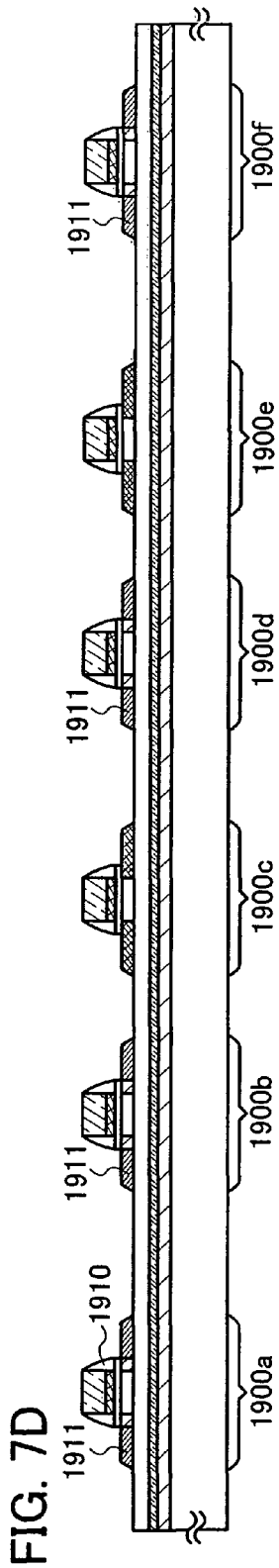

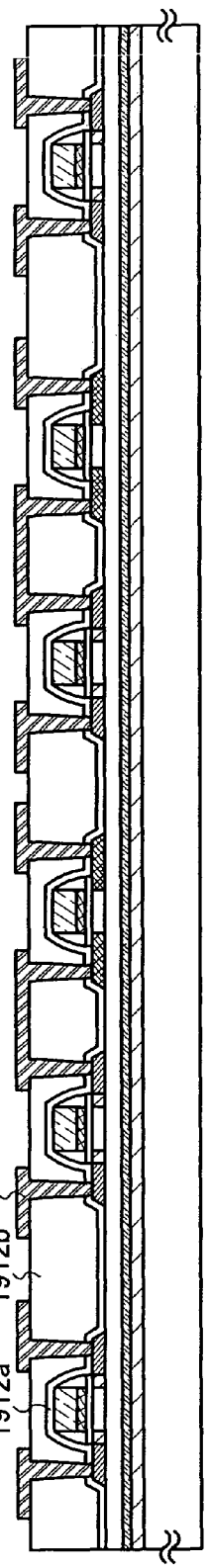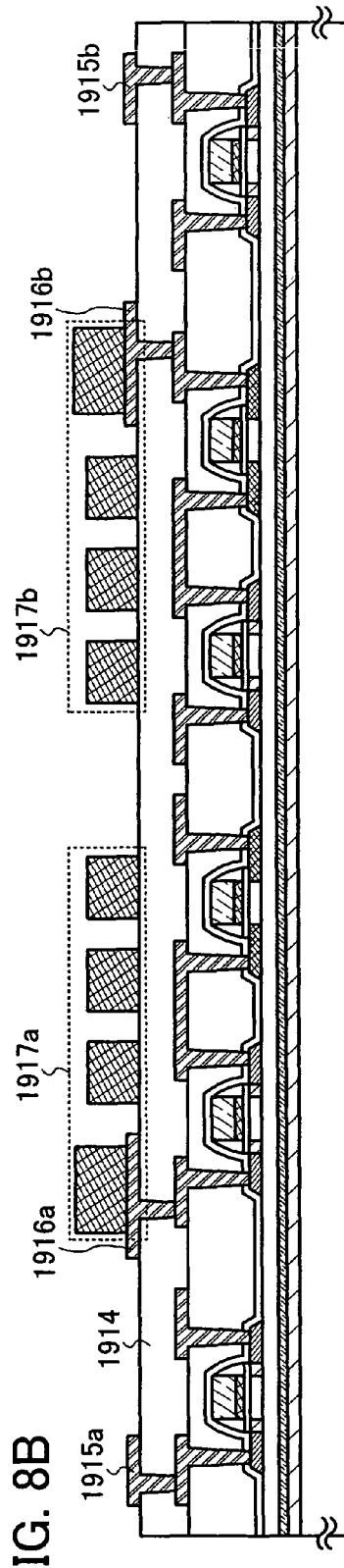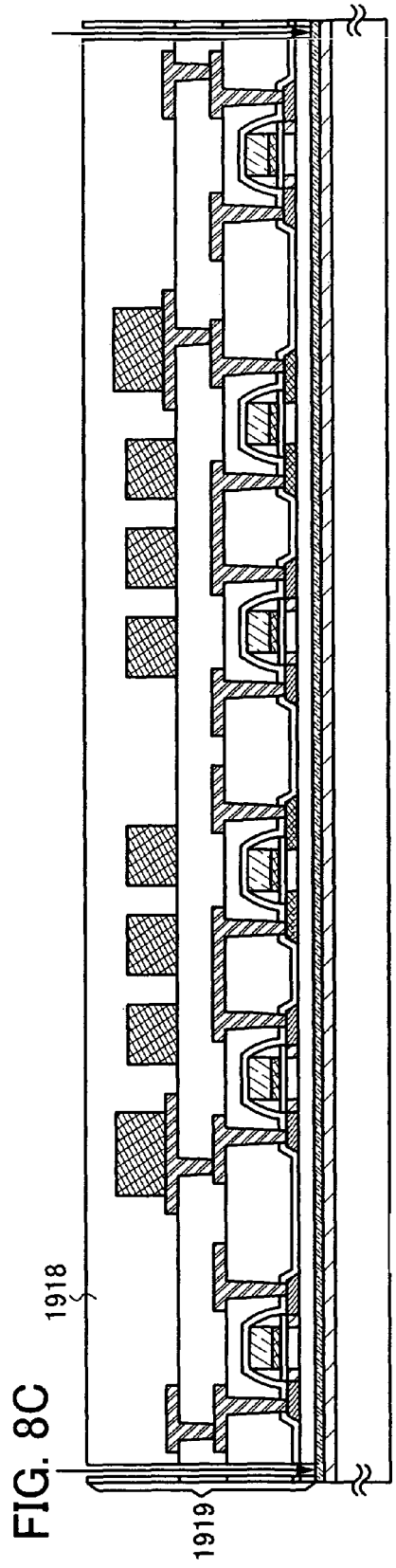

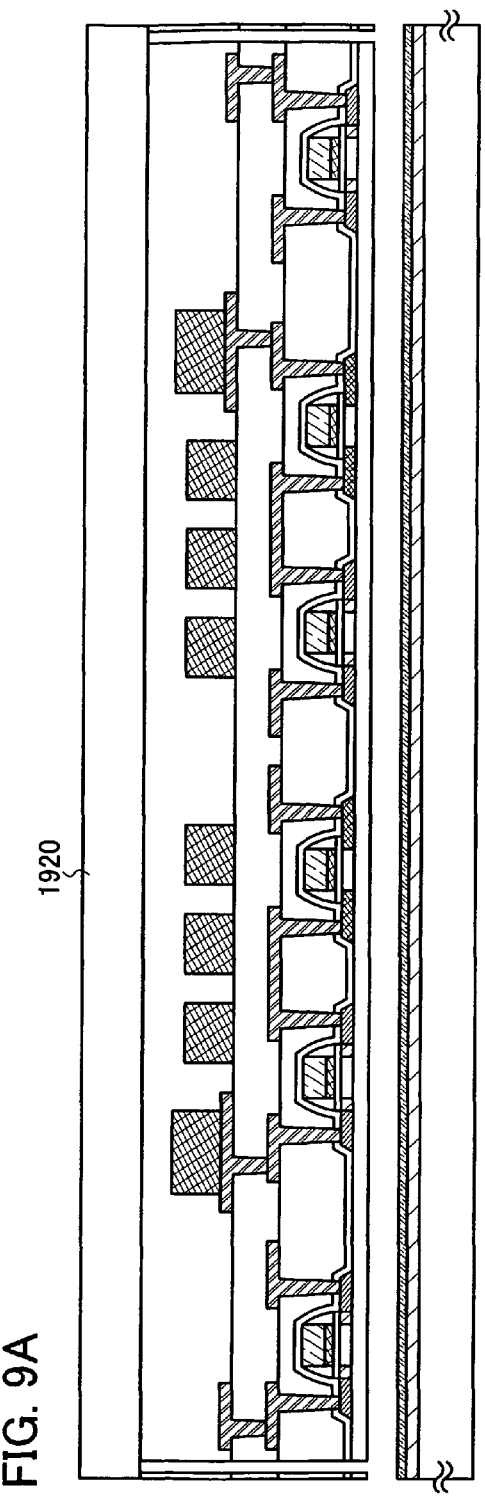
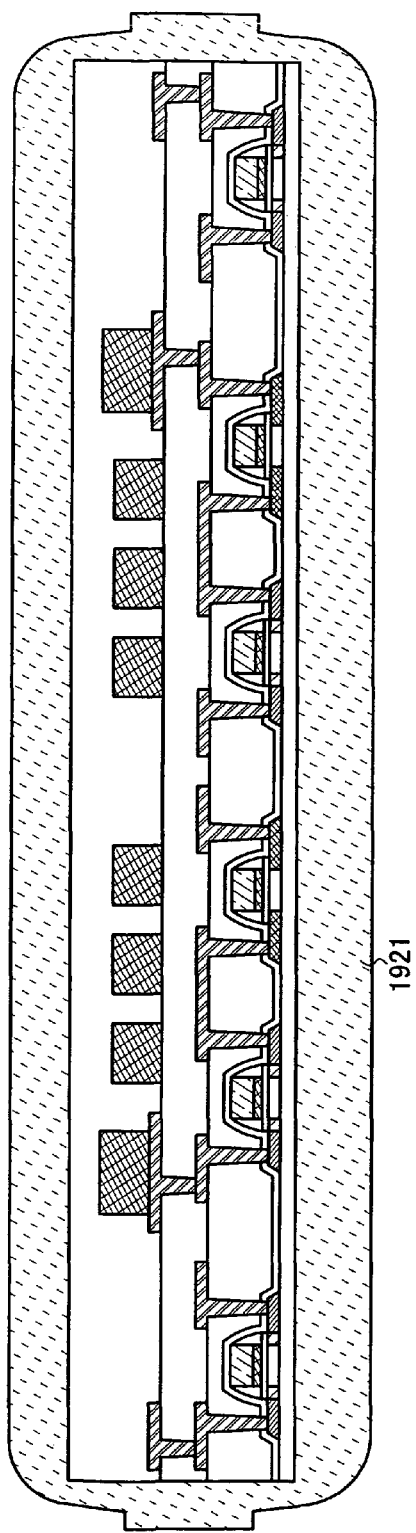
FIG. 9A
FIG. 9B

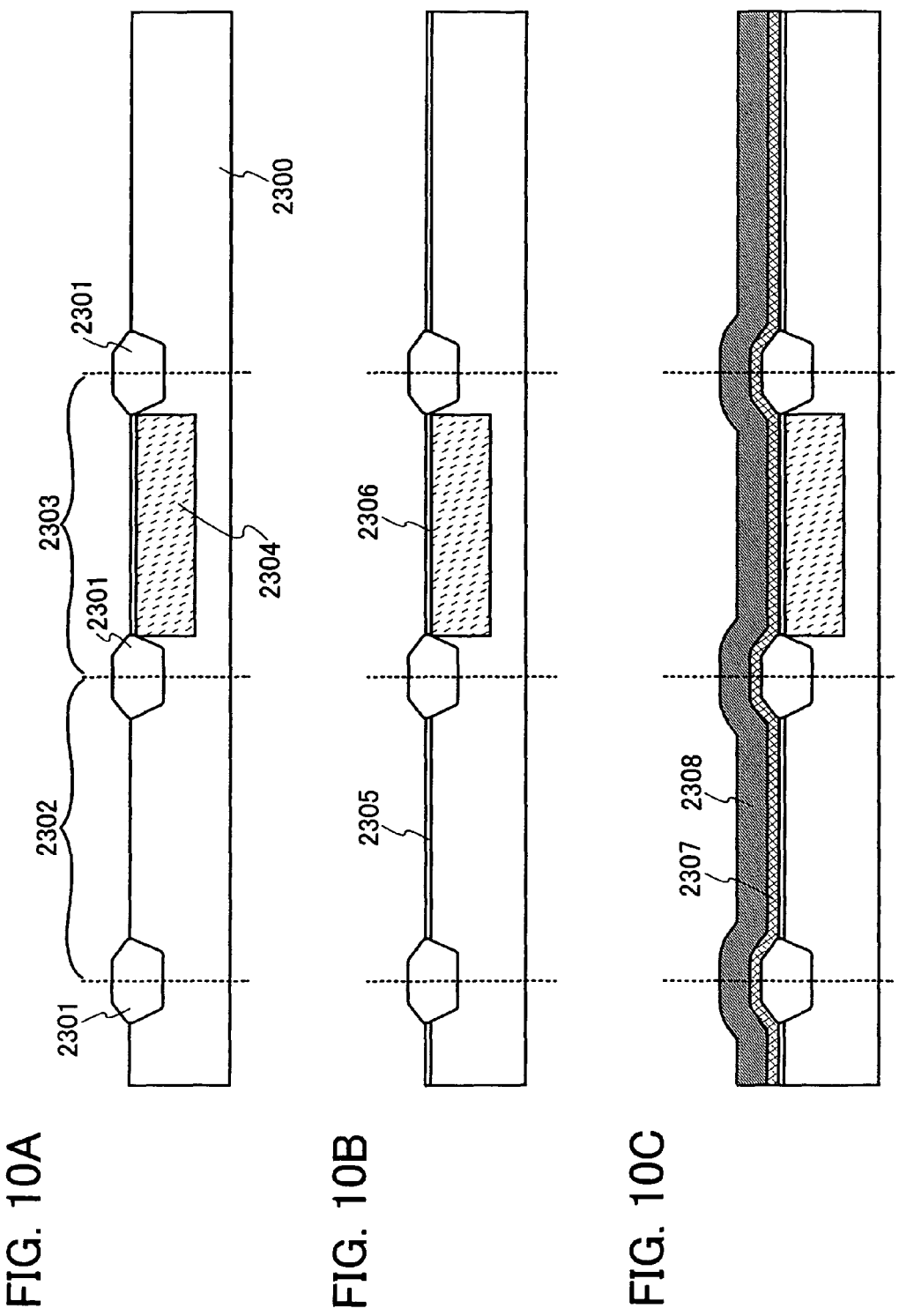

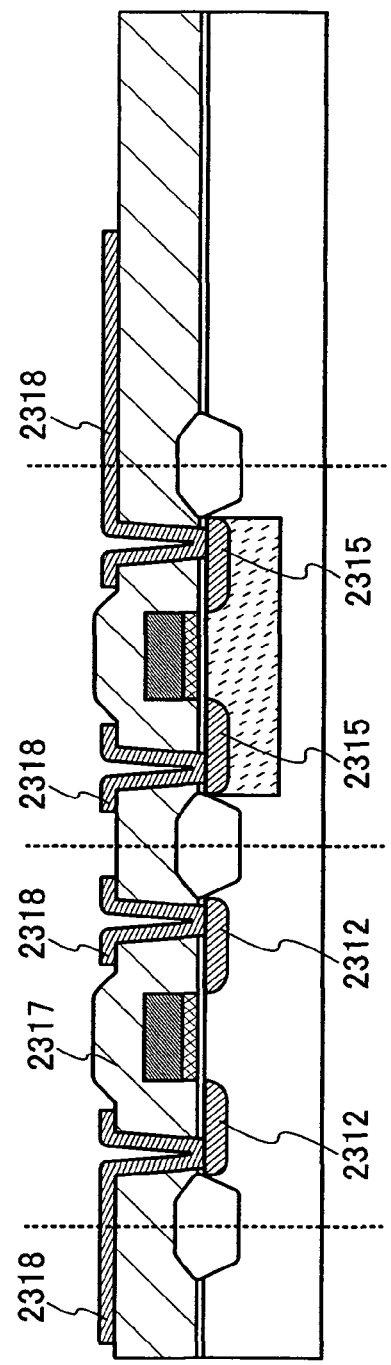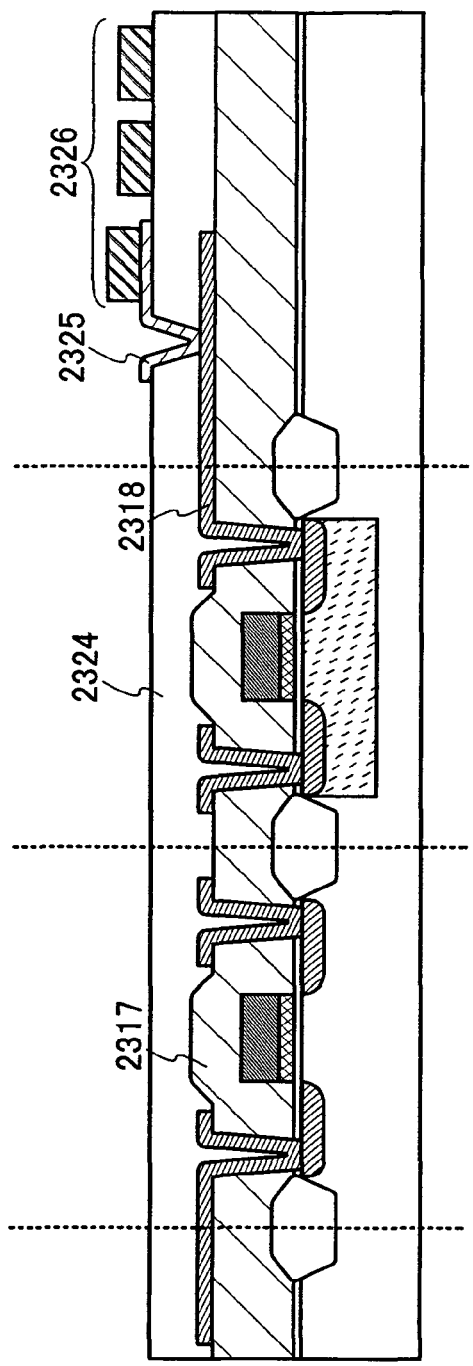
FIG. 12A
FIG. 12B

WIRELESS SYSTEM, SEMICONDUCTOR DEVICE, AND COMMUNICATION DEVICE

BACKGROUND OF THE INVENTION

1. Field of the Invention

The present invention relates to a semiconductor device that transmits and receives data using radio signals. In addition, the present invention relates to an external communication device that transmits and receives radio signals to/from the semiconductor device. Further, the present invention relates to a wireless system that includes the semiconductor device and the communication device.

2. Description of the Related Art

In recent years, a compact semiconductor device (hereinafter referred to as a semiconductor device, and also referred to as an RFID tag, wireless tag, ID tag, RF tag, or wireless chip) that is a combination of an ultra compact IC chip and an antenna for wireless communication has received a lot of attention. Data can be written to and read from the semiconductor device through transmission and reception of communication signals to/from an external communication device (hereinafter referred to as a communication device, and also referred to as a reader-writer, reader/writer, controller, or interrogator).

As an application field of the semiconductor device that transmits and receives data using radio signals, merchandise management in the distribution industry is given as an example. At present, merchandise management utilizing barcodes is the main stream; however, since barcodes are read optically, data cannot be read when there is an interrupting object. On the other hand, since the wireless data transmission method using a wireless communication device reads data of a semiconductor device by radio, the data can be read even when there is an interrupting object. Consequently, an improvement in efficiency, reduction in cost, and the like of merchandise management are expected. In addition, the semiconductor device is expected to be widely applied, such as to train tickets, airplane tickets, and automatic resets (for example, refer to Japanese Published Patent Application No. 2000-149194). In this manner, a system, which identifies or manages persons or objects with the use of a compact semiconductor device that transmits and receives data by radio communication, is called RFID (radio frequency identification), and is attracting attention as a fundamental technology of the IT society.

SUMMARY OF THE INVENTION

A semiconductor device is sometimes used in a bad environment such as high temperature, low temperature, or high humidity conditions. Further, the semiconductor device may be used by being attached to a portion to which mechanical stress is applied. Therefore, in order to improve the reliability of a system that uses the semiconductor device, very high durability is required for the semiconductor device. However, in order to provide the semiconductor device at low cost, it is impossible to use a costly process for the purpose of improving the durability.

The present invention is made in view of the foregoing problems, and it is an object of the present invention to provide a highly reliable wireless system, semiconductor device, and communication device at low cost. It is another object of the present invention to provide a highly reliable wireless system that includes a plurality of semiconductor devices and a communication device at low cost.

The wireless system of the present invention includes a communication device and a semiconductor device that includes a plurality of functional circuits with the same function. The semiconductor device transmits the processing results of the functional circuits. The communication device extracts a normal response from the processing results of the functional circuits through majority decision. Hereinafter, a specific structure of the wireless system of the present invention will be described.

A wireless system according to one aspect of the present invention includes a semiconductor device which includes a plurality of functional circuits and is configured to transmit processing signals of the plurality of functional circuits, and a communication device which includes an arithmetic processing circuit and is configured to receive the processing signals. The processing signals are transmitted by a time-division system. The arithmetic processing circuit in the communication device performs majority operation to the processing signals. Transmitting signals by a time-division system means transmitting signals at intervals of a unit time in this specification.

A wireless system according to another aspect of the present invention includes a plurality of semiconductor devices, each of which includes a functional circuit and is configured to transmit a processing signal of the functional circuit, and a communication device which includes an arithmetic processing circuit and is configured to receive the processing signal. The processing signals of the functional circuits of the plurality of semiconductor devices are transmitted by a time-division system. The arithmetic processing circuit in the communication device performs majority operation to the processing signals.

A semiconductor device according to one aspect of the present invention includes a plurality of functional circuits, a controller configured to sequentially read data stored in the plurality of functional circuits by a time-division system, and a transmission/reception circuit configured to transmit the data as a processing signal to a communication device and to receive processed data, wherein the processed data is output based on majority processed data obtained by majority operation in an arithmetic processing circuit included in the communication device. Reading data by a time-division system means reading data at intervals of a unit time in this specification.

A communication device according to one aspect of the present invention includes a transmission/reception circuit configured to receive processing signals transmitted from a semiconductor device including a plurality of functional circuits by a time-division system and to transmit processed data to the semiconductor device, and an arithmetic processing circuit configured to perform majority operation to the processing signals received by the transmission/reception circuit and to output majority processed data.

A communication device according to another aspect of the present invention includes a transmission/reception circuit configured to receive processing signals transmitted from a plurality of semiconductor devices each including a functional circuit by a time-division system and to transmit processed data to the semiconductor devices, and an arithmetic processing circuit configured to perform majority operation to the processing signals received by the transmission/reception circuit and to output majority processed data.

According to the present invention, a highly reliable wireless system, semiconductor device, and communication device can be provided in which, when part of the functional circuits included in the semiconductor device malfunctions due to mechanical or electrical breakdown and cannot provide a normal processing result, processing results of the other functional circuits can be utilized. In addition, a highly reliable wireless system and a highly reliable communication device can be provided in which, when one semiconductor device malfunctions due to mechanical or electrical breakdown and cannot provide a normal processing result, a normal processing result can be obtained from the other semiconductor devices.

BRIEF DESCRIPTION OF THE DRAWINGS

In the accompanying drawings:

FIGS. 7A to 7D are cross-sectional views of the semiconductor device of the present invention;

FIGS. 8A to 8C are cross-sectional views of the semiconductor device of the present invention;

FIGS. 9A and 9B are cross-sectional views of the semiconductor device of the present invention;

FIGS. 10A to 10C are cross-sectional views of the semiconductor device of the present invention;

FIGS. 12A and 12B are cross-sectional views of the semiconductor device of the present invention.

DETAILED DESCRIPTION OF THE INVENTION

Hereinafter, embodiment of the present invention will be described with reference to the accompanying drawings. Note that the present invention can be implemented in various different ways and it will be easily understood by those skilled in the art that various changes and modifications can be made in the present invention without departing from the spirit and scope thereof. Therefore, the present invention should not be construed as being limited to the description in the following embodiment. In the structure of the present invention described below, like numerals denote corresponding features consistently throughout the attached drawings. Therefore, repetitive description of them will be omitted.

Embodiment 1

Figure 1:
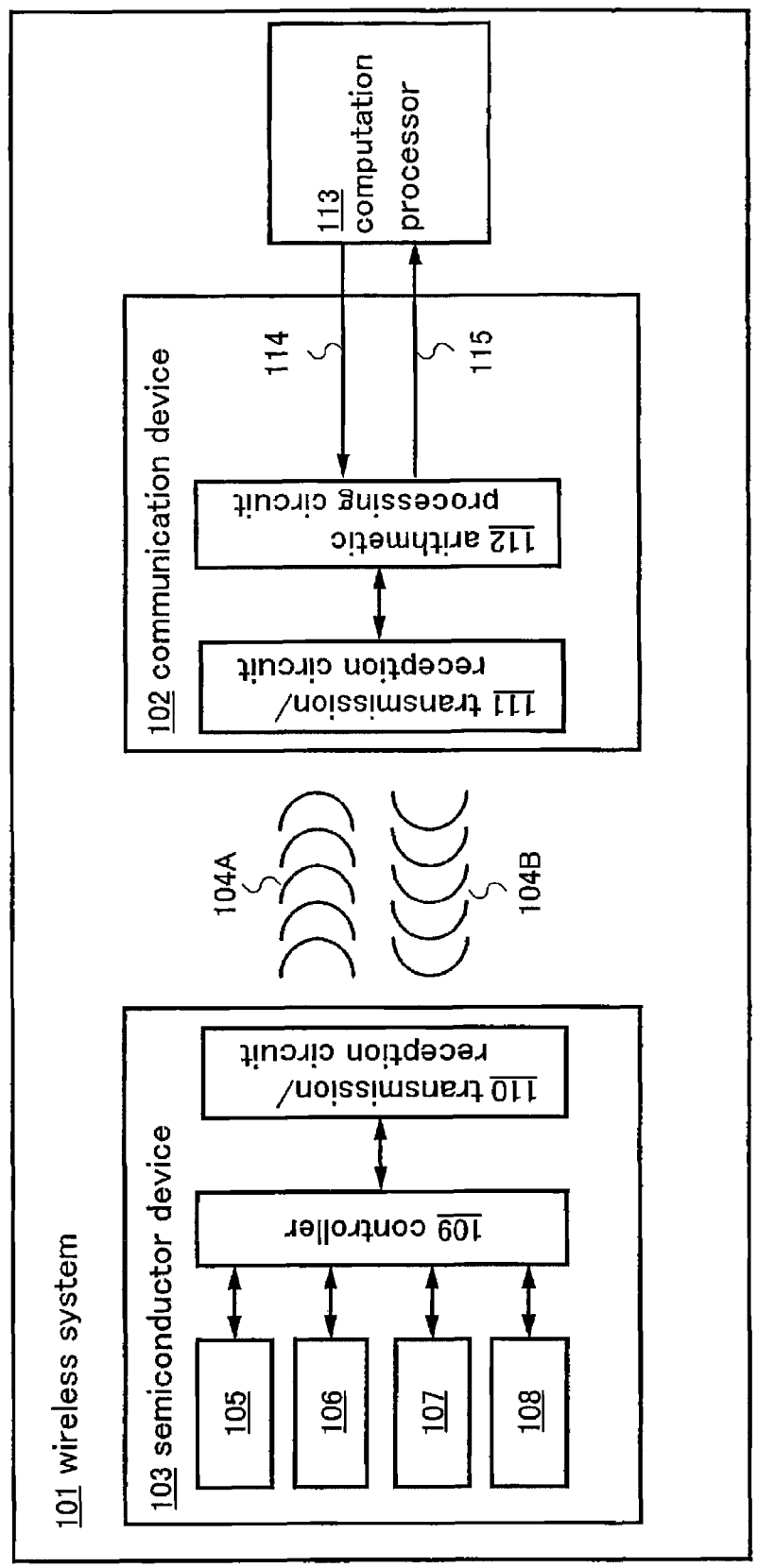
FIG. 1 is a block diagram of the wireless system of the present invention.
Figure 2:
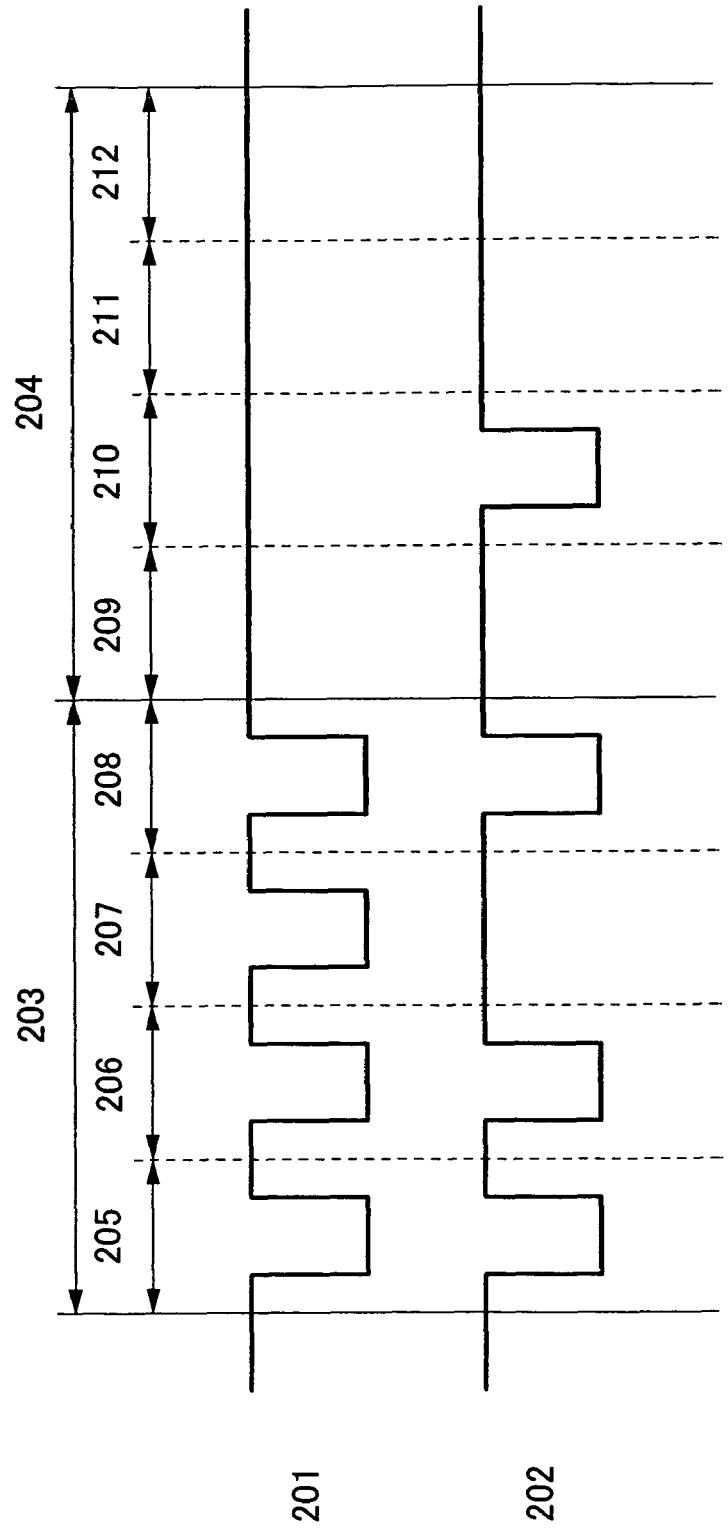
FIG. 2 illustrates the waveforms of communication signals between the semiconductor device and the communication device of the wireless system of the present invention.
Figure 5:
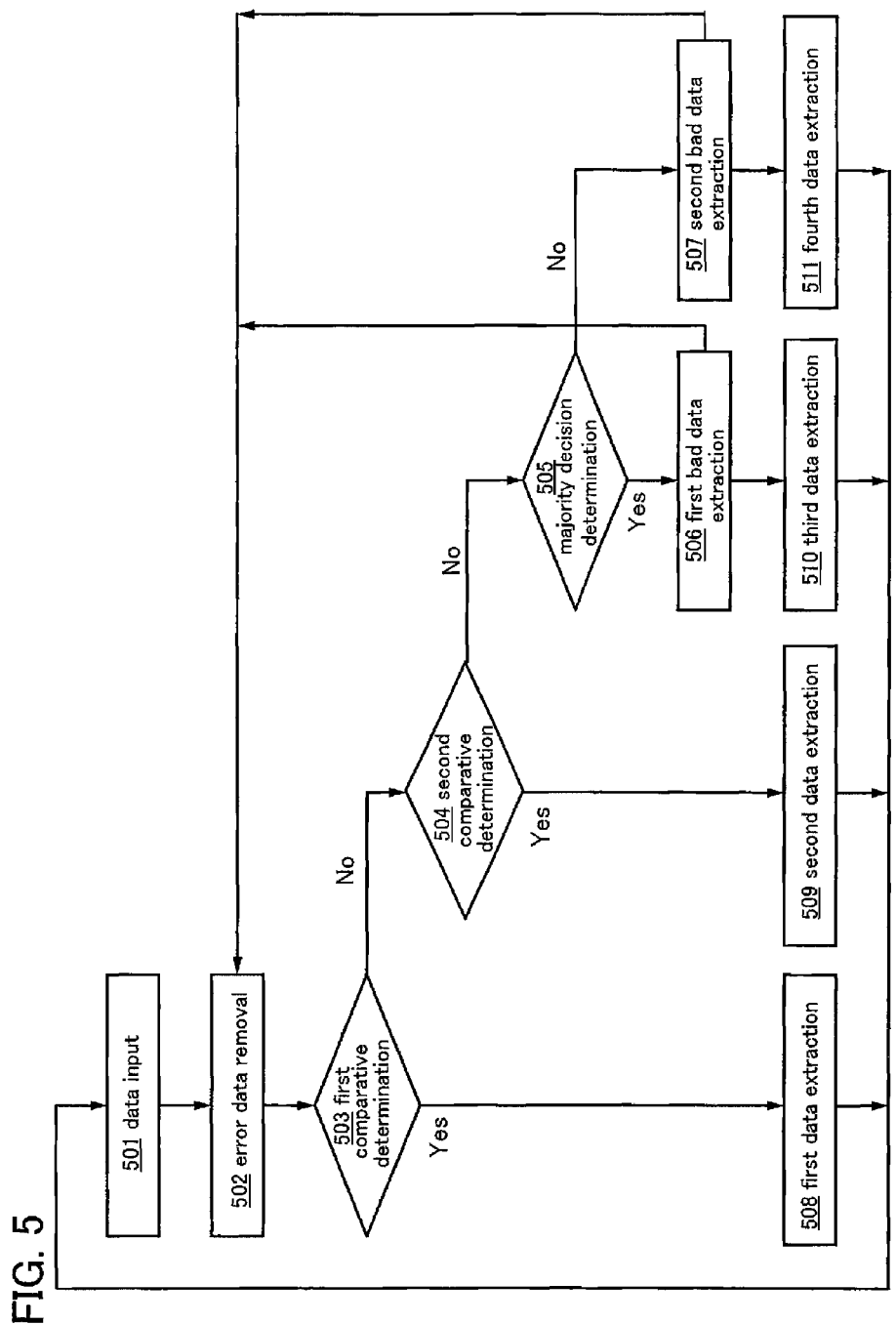
FIG. 5 is a flow chart of the wireless system of the present invention.
Figure 6:
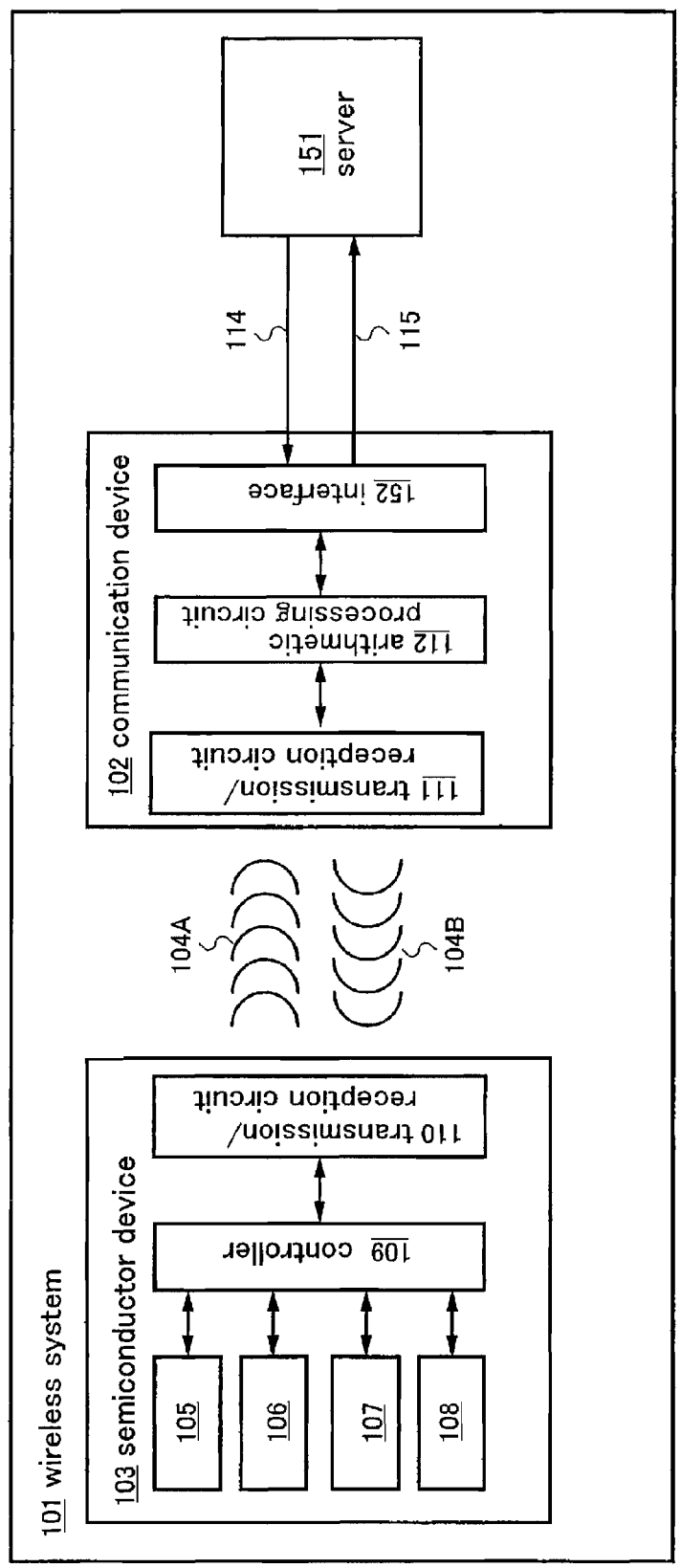
FIG. 6 is a block diagram of the wireless system of the present invention.

This embodiment will describe exemplary configurations of a wireless system, semiconductor device, and communication device of the present invention, with reference to FIGS. 1, 2, 5, and 6. FIGS. 1 and 6 are block diagrams of the wireless system of the present invention in accordance with this embodiment. FIG. 2 illustrates the waveforms of radio signals of the wireless system of the present invention in accordance with this embodiment. FIG. 5 is a flow chart illustrating the majority operation in this embodiment.

Referring to FIG. 1, a wireless system 101 includes a communication device 102 and a semiconductor device 103. The communication device 102 and the semiconductor device 103 communicate data to each other, using a first radio signal 104A and a second radio signal 104B. Note that the first radio signal 104A is a signal transmitted from the semiconductor device 103 to the communication device 102, and the second radio signal 104B is a signal transmitted from the communication device 102 to the semiconductor device 103. The semiconductor device 103 includes first to fourth functional circuits 105 to 108 with the same function, a controller 109, and a transmission/reception circuit 110. The communication device 102 includes a transmission/reception circuit 111, an arithmetic processing circuit 112, and a computing unit 113. Although this embodiment describes the wireless system 101 that has the semiconductor device 103 including four functional circuits, the following description can be easily applied to the wireless system 101 that has a semiconductor device including n functional circuits (n is a natural number not less than three).

Application software of the wireless system is running on the computing unit 113. The computing unit 113 is designed to have a computational capacity required for executing the application software. Note that the computing unit 113 has functions of outputting processed data 114 to the arithmetic processing circuit 112 based on the execution result of the application software and receiving majority processed data 115 from the arithmetic processing circuit 112. Here, the processed data 114 includes a command to be executed by the semiconductor device 103 and data required for the executing the command.

The transmission/reception circuit 111 in the communication device 102 has a function of reproducing first to fourth processing data from the first radio signal 104A that has been transmitted from the semiconductor device 103. Specifically, for example, the transmission/reception circuit 111 has a demodulation circuit that has functions of extracting time-series serial data of "H" or "L" from changes in amplitude of the first radio signal 104A and reproducing the first to fourth processing data in accordance with the communication specifications. In addition, the transmission/reception circuit 111 has functions of superimposing the processed data 114 output from the arithmetic processing circuit 112 on the second radio signal 104B and transmitting the data to the semiconductor device 103. Specifically, for example, the transmission/reception circuit 111 has a modulation circuit that has functions of converting the processed data to time-series serial data of "H" or "L" and transmitting the second radio signal 104B whose amplitude is changed based on the serial data. Alternatively, the transmission/reception circuit 111 has a modulation circuit that has functions of converting the processed data to time-series serial data of "H" or "L" and transmitting the second radio signal 104B whose frequency is changed based on the serial data. The arithmetic processing circuit 112 has a function of outputting the processed data 114 output from the computing unit 113 to the transmission/reception circuit 111 and a function of producing the majority processed data 115 based on the first to fourth processing data.

Note that the processed data 114 output from the computing unit 113 is processed by addition of parity data or the like in the arithmetic processing circuit 112, and is output to the transmission/reception circuit 111. Therefore, the processed data output from the computing unit 113 may be referred to as first processed data, and the processed data output from the arithmetic processing circuit 112 may be referred to as processed second data. The parity data is used for so-called parity checking. That is, the parity data is used for checking if the processed data could have been transmitted from the communication device with certainty. Further, a start signal, a synchronizing signal, and the like may be added in converting the processed data to the time-series serial data of "H" or "L." The start signal is a signal which indicates the start timing of data transmission. For example, the start signal is a signal that is at "L" for a given period. The synchronizing signal is a signal for synchronizing an internal clock of the semiconductor device 103. For example, the synchronizing signal is a signal that is at "L" a given number of times at regular time intervals.

Although the communication device 102 in FIG. 1 includes the computing unit 113, the computing unit 113 may be provided outside the communication device 102 in the present invention. FIG. 6 illustrates a configuration in which the function of the computing unit is implemented by a sever that is provided outside the communication device. In the description of FIG. 6, only the points that differ from those in FIG. 1 will be described. The wireless system 101 illustrated in FIG. 6 includes a communication device 102, a semiconductor device 103, and a server 151. The communication device 102 includes the transmission/reception circuit 111, the arithmetic processing circuit 112, and an interface 152.

The server 151 illustrated in FIG. 6 is a computing device on which the application software of the wireless system is run. For the server 151, a personal computer (PC), workstation (WS), so-called cluster that connects personal computers or workstations over a network can be used for example, and selected in accordance with the computational capacity required for executing the application software. Note that the server 151 has a function of outputting the processed data 114 to the communication device 102 based on the execution result of the application software and a function of receiving the majority processed data 115 from the communication device 102. Here, the processed data 114 includes a command to be executed in the semiconductor device 103 and data necessary for executing the command.

The transmission/reception circuit 110 in the semiconductor device 103 has a function of extracting the processed data superimposed on the second radio signal 104B that has been transmitted from the communication device 102. Specifically, the transmission/reception circuit 110 may have a demodulation circuit that has functions of extracting the time-series serial data of "H" or "L" from changes in amplitude of the second radio signal 104B and reproducing the processed data in accordance with the communication specifications. In addition, the transmission/reception circuit 110 has functions of superimposing the first to fourth processing results of the first to fourth functional circuits 105 to 108, respectively, on the first radio signal 104A as the first to fourth processing data and transmitting the data to the communication device 102. Specifically, the transmission/reception circuit 110 may have a modulation circuit that has functions of converting the first to fourth processing data to time-series serial data of "H" or "L" and transmitting the first radio signal 104A whose amplitude is changed based on the serial data.

The controller 109 has functions of retrieving a command, data necessary for execution of the command, or the like from the processed data and outputting it to the first to fourth functional circuits 105 to 108. In addition, the controller 109 receives the first to fourth processing results of the first to fourth functional circuits 105 to 108, respectively, and outputs the processing results as the first to fourth processing data to the transmission/reception circuit 110.

Each of the first to fourth functional circuits 105 to 108 appropriately processes the command, data necessary for execution of the command, or the like that has been received from the controller 109. Examples of the command include a command of reading a unique ID number, a decryption command, and an encryption command. Note that each of the first to fourth functional circuits 105 to 108 executes the same processing in response to the command.

The majority processed data 115 produced in the communication device 102 is obtained by comparing the first to fourth processing data with each other and selecting the majority content as normal data. That is, the majority processed data 115 is determined by majority operation. Specifically, when each of the first to fourth processing data has a first content, the first content is adopted for the majority processed data 115. In addition, when each of the first, second, and fourth processing data has a second content, whereas the third processing data has a third content, the second content is adopted for the majority processed data 115. Further, when each of the first and second processing data has a fourth content, the third processing data has a fifth content, and the fourth processing data has a sixth content, the fourth content is adopted for the majority processed data 115. Producing the majority processed data 115 in this manner can retrieve normal data even when at least one of the first to fourth processing data is an error, that is, when at least one of the first to fourth functional circuits 105 to 108 of the semiconductor device 103 malfunctions due to mechanical or electrical breakdown.

As an example of a majority-decision algorithm, a pattern matching method is given in which a data stream of two or more bits of the first to fourth processing data is checked. In this method, normal data can be retrieved even when, for example, up to two pieces of processing data out of four pieces of processing data are errors. Generally, normal data can be retrieved even when up to (n−2) pieces of processing data out of n pieces of processing data are errors. Therefore, the reliability of the semiconductor device 103 in the case of malfunction due to mechanical or electrical breakdown can be improved.

Note that the majority operation can be implemented using dedicated hardware, software with a CPU, or combination of hardware and software. When dedicated hardware is used, processing time can be short. When software is used, system change and the like can be easily carried out. Further, when both the hardware and software are used, both advantages can be utilized.

The aforementioned majority operation will be described in detail with reference to the flow chart in FIG. 5. First, the first to fourth processing data that are received from the semiconductor device are input to the arithmetic processing circuit 112 (Data Input 501). Here, one bit of each of the first to fourth processing data is input.

Next, the arithmetic processing circuit 112 performs majority operation. In the majority operation, processing data which is an error is removed from among the first to fourth processing data (Error Data Removal 502). This process is accomplished by storing the number of the processing data that has been determined to be an error in the previous majority operation and retrieving only processing data other than the processing data that corresponds to the stored number. Here, the numbers of the first to fourth processing data are 1 to 4, respectively.

Next, whether all of the processing data are "H" or not is determined (First Comparison 503). If the answer to the first comparison 503 is "Yes," "H" is acquired as the majority processed data 115 (First Data Extraction 508). On the other hand, if the answer to the first comparison 503 is "No," whether all of the processing data are "L" or not is determined (Second Comparison 504). If the answer to the second comparison 504 is "Yes," "L" is acquired as the majority processed data 115 (Second Data Extraction 509).

If the answer to the second comparison 504 is "No," it means there are errors among the first to fourth processing data. That is, majority decision is necessary. Therefore, if "H" is the majority or not among the first to fourth processing data is determined (Majority Decision 505). If the answer to the majority decision 505 is "Yes," the number of the processing data that is "L," in other words, the number of the error processing data is extracted (First Error Data extraction 506), and the number of the error processing data is stored so as to be used in the next error data removal 502. At the same time, "H" is acquired as the majority processed data 115 (Third Data Extraction 510).

On the other hand, if the answer to the majority decision 505 is "No," the number of the processing data that is "H," in other words, the number of the error processing data is extracted (Second Error Data Extraction 507). The number of the error processing data is stored to be used in the next error data removal 502. At the same time, "L" is acquired as the majority processed data 115 (Forth Data Extraction 511).

Through the first data extraction 508 to the fourth data extraction 511, the majority operation for each bit of the first to fourth processing data is completed. Next, majority operation for the next bits from the data input 501 is executed. By repeatedly executing the majority operation for each bit in this manner, majority operation for the first to fourth processing data is completed.

The wireless system of the present invention that is described in this embodiment can retrieve normal data by majority operation even when at least one of the first to fourth functional circuits 105 to 108 of the semiconductor device 103 is broken. A communication method using the first radio signal 104A that can easily implement such a wireless system will be described with reference to FIG. 2.

FIG. 2 illustrates the envelopes of the waveforms of signals that are transmitted from the semiconductor device 103 to the communication device 102. A first communication signal waveform 201 represents the envelope of the waveform of a communication signal when all of the first to fourth functional circuits 105 to 108 in the semiconductor device 103 are operating normally. A second communication signal waveform 202 represents the envelope of the waveform of a communication signal when the second functional circuit 106 and the third functional circuit 107 malfunction due to mechanical or electrical breakdown. In each of a first period 203 and a second period 204, "L" or "H" is transmitted as normal data. In a (1-1)th period 205 to a (1-4)th period 208, the processing data of each of the first to fourth functional circuits 105 to 108 in FIG. 1 is transmitted. In a (2-1)th period 209 to a (2-4)th period 212, the processing data of each of the first to fourth functional circuits 105 to 108 in FIG. 1 is transmitted. Although this embodiment illustrates the communication protocol in which the amplitude of the envelope of the communication signal waveform is either small or large when "L" or "H" is transmitted as the normal data, a different communication protocol may be employed.

The communication method in the present invention has a feature that the first to fourth processing data of the first to fourth functional circuits 105 to 108, respectively are sequentially transmitted in time series. That is, the first to fourth processing data of the first to fourth functional circuits 105 to 108, respectively are sequentially transmitted to the communication device 102 by a time-division system. Transmitting data by a time-division system means transmitting data at intervals of a unit time in this specification. The reason that the majority operation of the arithmetic processing circuit 112 can be easily carried out with such a communication method will be described below.

The first reason is that since the data is continuous in time series, the majority operation can be conducted in real time. That is, even when a larger number of functional circuits are provided in the semiconductor device 103, the majority operation can be executed before the communication device 102 has received all of the processing data. For this reason, a dedicated buffer for storing data received is not necessary and, thus, the communication device can be provided at low cost. Further, the processing speed of the communication device is improved, resulting in improved performance of the wireless system 101.

The second reason is that in the case where all of the first to fourth functional circuits 105 to 108 are operating normally, the first communication signal waveform should be the one in the period 203 that has four continuous small amplitudes or the one in the period 204 that has four continuous large amplitudes. Therefore, by using an algorithm, which first inspects the presence of either of the two waveforms, for the majority operation of the arithmetic processing circuit 112, the majority processed data 115 can be easily obtained. Therefore, the processing speed of the communication device is improved, resulting in improved performance of the wireless system 101.

The third reason is that based on the result of the majority operation for the processing data that has been received previously, the majority operation for the processing data that is received subsequently can be simplified. For example, since the second communication signal waveform in the period 203 differs from that in the case where all of the functional circuits are operating normally as described for the second reason, the majority operation should be further continued. Here, "L" is adopted since the processing data are "L," "L," "H," and "L." In addition, since the second communication signal waveform in the period 204 differs from that in the case where all of the functional circuits are operating normally as described for the second reason, the majority operation should be further continued. Here, "H" is adopted since the processing data are "H," "L," "H," and "H."

The result in the period 203 shows that the third processing data is an error, that is, the third functional circuit 107 malfunctions due to mechanical or electrical breakdown. Therefore, even when the majority operation in the period 204 is executed for the first processing data "H," the second processing data "L," and the fourth processing data "H" excluding the third processing data, a similar result can be obtained. That is, the processing speed of the communication device is improved, resulting in improved performance of the wireless system 101. Similarly, the result in the period 204 shows that the second processing data is also an error, that is, the second functional circuit 106 malfunctions due to mechanical or electrical breakdown. Therefore, in the subsequent majority operation, only the first and fourth processing data should be inspected. That is, the processing speed of the communication device is improved, resulting in improved performance of the wireless system 101. Note that in this case, if both the first and fourth processing data are normal, just the first processing data can be used as the majority processed data 115 without any majority operation. Thus, the processing speed of the communication device is improved, resulting in improved performance of the wireless system 101.

With the aforementioned configuration, a highly reliable and inexpensive wireless system can be provided in which, when part of the functional circuits included in the semiconductor device malfunctions due to mechanical or electrical breakdown and cannot provide a normal processing result, processing results of the other functional circuits can be utilized.

Embodiment 2

Figure 3:
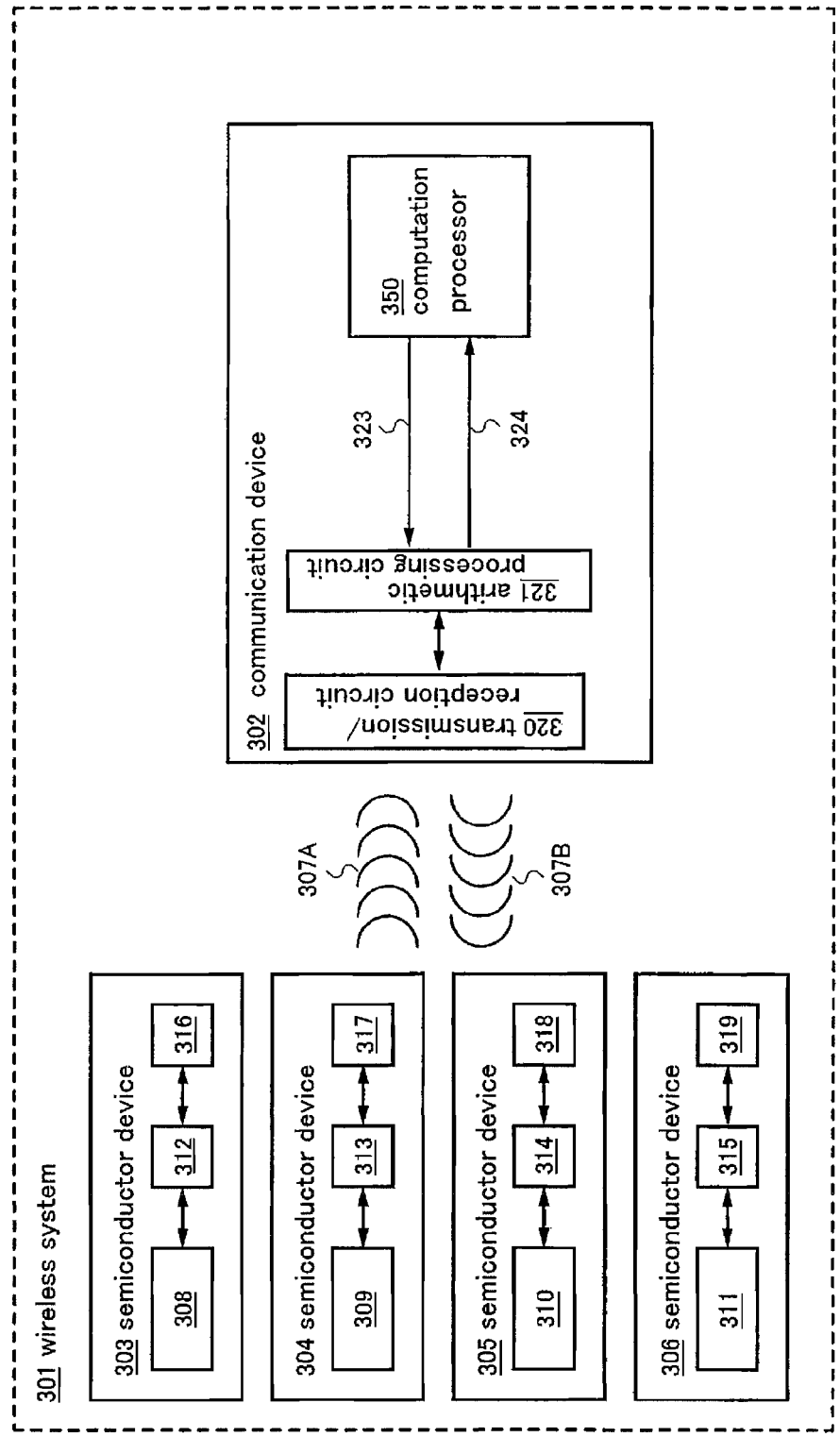
FIG. 3 is a block diagram of the wireless system of the present invention.
Figure 4:
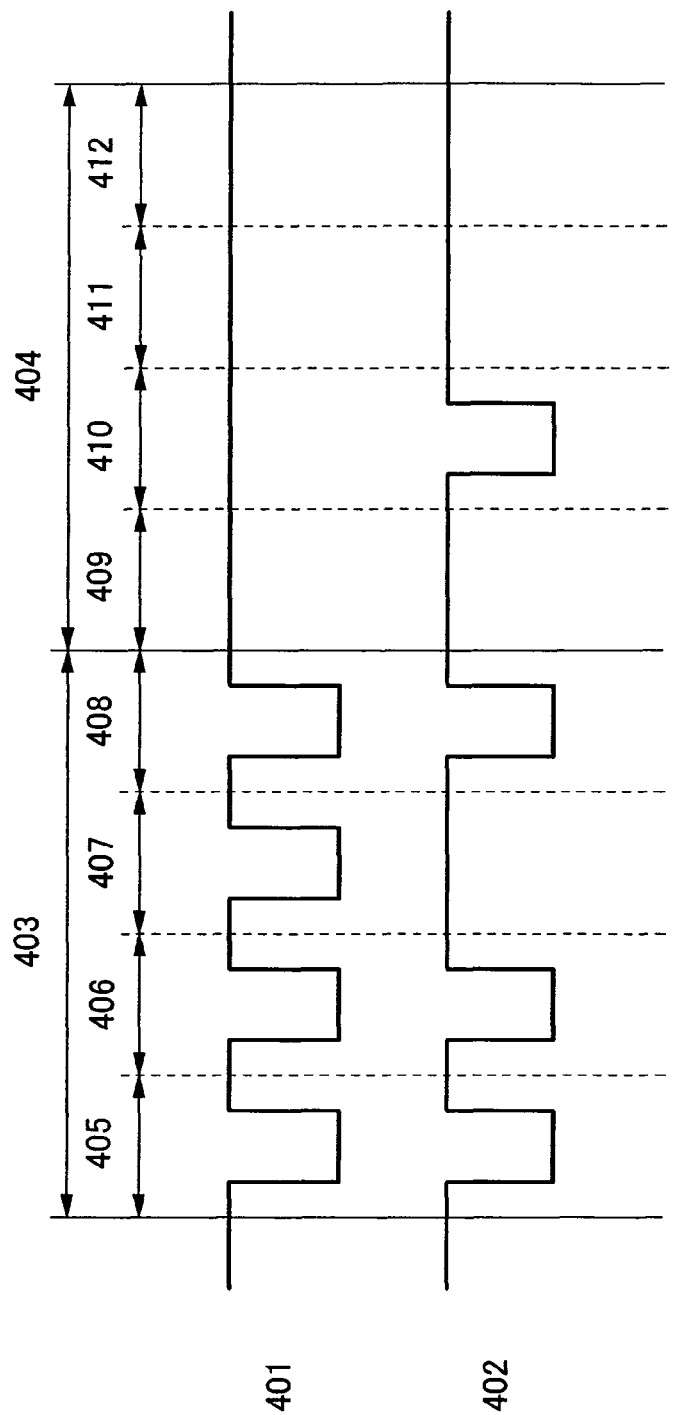
FIG. 4 illustrates the waveforms of communication signals between the semiconductor device and the communication device of the wireless system of the present invention.

This embodiment will describe an exemplary configuration of a wireless system of the present invention which differs from that in Embodiment 1, with reference to FIGS. 3 and 4. FIG. 3 is a block diagram of the wireless system of the present invention in accordance with this embodiment. FIG. 4 illustrates the waveforms of radio signals of the wireless system of the present invention in accordance with this embodiment.

Referring to FIG. 3, a wireless system 301 includes a communication device 302 and first to fourth semiconductor devices 303 to 306. The communication device 302 and the first to fourth semiconductor devices 303 to 306 communicate data to each other, using a first radio signal 307A and a second radio signal 307B. Note that the first radio signal 307A is a signal that is transmitted from the first to fourth semiconductor devices 303 to 306 to the communication device 302, and the second radio signal 307B is a signal that is transmitted from the communication device 302 to the first to fourth semiconductor devices 303 to 306. The first semiconductor device 303 includes a first functional circuit 308, a first controller 312, and a first transmission/reception circuit 316. The second semiconductor device 304 includes a second functional circuit 309, a second controller 313, and a second transmission/reception circuit 317. The third semiconductor device 305 includes a third functional circuit 310, a third controller 314, and a third transmission/reception circuit 318. The fourth semiconductor device 306 includes a fourth functional circuit 311, a fourth controller 315, and a fourth transmission/reception circuit 319. Note that the first to fourth semiconductor devices 303 to 306 have the same response to at least one command. Described below is the operation for such a command. The communication device 302 includes a transmission/reception circuit 320, an arithmetic processing circuit 321, and a computing unit 350. Although this embodiment describes the wireless system 301 having four semiconductor devices 303 to 306, the following description can be easily applied to the wireless system 301 having n semiconductor devices (n is a natural number not less than three).

Application software of the wireless system is run on the computing unit 350. The computing unit 350 is designed to have a computational capacity required for executing the application software. Note that the computing unit 350 has functions of outputting processed data 323 to the arithmetic processing circuit 321 based on the execution result of the application software and receiving majority processed data 324 from the arithmetic processing circuit 321. Here, the processed data 323 includes a command to be executed by the first to fourth semiconductor devices 303 to 306 and data necessary for executing the command.

The transmission/reception circuit 320 in the communication device 302 has a function of reproducing first to fourth processing data from the first radio signal 307A that has been transmitted from the first to fourth semiconductor devices 303 to 306. Specifically, the transmission/reception circuit 320 has a demodulation circuit that has functions of extracting time-series serial data of "H" or "L" from changes in amplitude of the first radio signal 307A and reproducing the first to fourth processing data in accordance with the communication specifications. In addition, the transmission/reception circuit 320 has functions of superimposing the processed data 323 output from the arithmetic processing circuit 321 on the second radio signal 307B and transmitting the data to the first to fourth semiconductor devices 303 to 306. Specifically, the transmission/reception circuit 320 has a modulation circuit that has functions of converting the processed data to time-series serial data of "H" or "L" and transmitting the second radio signal 307B whose amplitude is changed based on the serial data. Alternatively, the transmission/reception circuit 320 has a modulation circuit that has functions of converting the processed data to time-series serial data of "H" or "L" and transmitting the second radio signal 307B whose frequency is changed based on the serial data. The arithmetic processing circuit 321 has functions of outputting the processed data 323 output from the computing unit 350 to the transmission/reception circuit 320 and producing the majority processed data 324 based on the first to fourth processing data.

Note that the processed data 323 output from the computing unit 350 is processed by addition of parity data or the like in the arithmetic processing circuit 321, and is output to the transmission/reception circuit 320. Therefore, the processed data output from the computing unit 350 may be referred to as first processed data, and the processed data output from the arithmetic processing circuit 321 may be referred to as second processed data. The parity data is used for so-called parity checking. That is, the parity data is used for checking if the processed data could have been transmitted from the communication device with certainty. Further, a start signal, a synchronizing signal, and the like may be added in converting the processed data to the time-series serial data of "H" or "L." The start signal is a signal which indicates the start timing of data transmission. For example, the start signal is a signal that is at "L" for a given period. The synchronizing signal is a signal for synchronizing an internal clock of the first to fourth semiconductor devices 303 to 306. For example, the synchronizing signal is a signal that is at "L" a given number of times at regular time intervals.

Although the communication device 302 in FIG. 3 includes the computing unit 350, the computing unit 350 may be provided outside the communication device 302 in the present invention, as in the configuration of the communication device in FIG. 6 described in Embodiment 1.

The first transmission/reception circuit 316 in the first semiconductor device 303 has a function of extracting the processed data superimposed on the second radio signal 307B that has been transmitted from the communication device 302. Specifically, the transmission/reception circuit 316 may have a demodulation circuit that has functions of extracting the time-series serial data of "H" or "L" from changes in amplitude of the second radio signal 307B and reproducing the processed data in accordance with the communication specifications. In addition, the first transmission/reception circuit 316 has functions of superimposing a first processing result of the first functional circuit 308 on the first radio signal 307A as the first processing data and transmitting the data to the communication device 302. Specifically, the first transmission/reception circuit 316 may have a modulation circuit that has functions of converting the first processing data to time-series serial data of "H" or "L" and transmitting the first radio signal 307A whose amplitude is changed based on the serial data.

The first controller 312 has functions of retrieving a command, data necessary for execution of the command, or the like from the processed data and outputting it to the first functional circuit 308. In addition, the first controller 312 receives the first processing result of the first functional circuit 308 and transmits it as the first processing data to the first transmission/reception circuit 316.

The first functional circuit 308 appropriately processes the command, data necessary for execution of the command, or the like that has been received from the first controller 312. Examples of the command include a command of reading a unique ID number, a decryption command, and an encryption command.

Although only the first semiconductor device 303 has been described heretofore, each of the second to fourth semiconductor devices 304 to 306 has a configuration with the same function as the first semiconductor device. Therefore, detailed description of the second to fourth semiconductor devices 304 to 306 will be omitted in this embodiment.

The majority processed data 324 produced in the communication device 302 is obtained by comparing the first to fourth processing data with each other and selecting the majority content as normal data. That is, the majority processed data 324 is determined by majority operation. Specifically, when each of the first to fourth processing data has a first content, the first content is adopted for the majority processed data 324. In addition, when each of the first, second, and fourth processing data has a second content, whereas the third processing data has a third content, the second content is adopted for the majority processed data 324. Further, when each of the first and second processing data has a fourth content, the third processing data has a fifth content, and the fourth processing data has a sixth content, the fourth content is adopted for the majority processed data 324. Producing the majority processed data 324 in this manner can retrieve normal data even when at least one of the first to fourth processing data is an error, that is, when at least one of the first to fourth semiconductor devices 303 to 306 malfunctions due to mechanical or electrical breakdown.

As an example of a majority-decision algorithm, a pattern matching method is given in which a data stream of two or more bits of the first to fourth processing data is checked. In this method, normal data can be retrieved even when, for example, up to two pieces of processing data out of four pieces of processing data are errors. Generally, normal data can be retrieved even when up to (n−2) pieces of processing data out of n pieces of processing data are errors. Therefore, the reliability of the first to fourth semiconductor devices 303 to 306 in the case of malfunction due to mechanical or electrical breakdown can be improved.

Note that the majority operation can be implemented using dedicated hardware, software with a CPU, or combination of hardware and software. When dedicated hardware is used, processing time can be short. When software is used, system change and the like can be easily carried out. Further, when both the hardware and software are used, both advantages can be utilized.

The majority operation in this embodiment is consistent with the flow chart in FIG. 5 that is described in Embodiment 1. Therefore, specific description thereof is omitted in this embodiment.

The wireless system of the present invention that is described in this embodiment can retrieve normal data by majority operation even when at least one of the first to fourth semiconductor devices 303 to 306 malfunctions due to mechanical or electrical breakdown. A communication method using the first radio signal 307A that can easily implement such a wireless system will be described with reference to FIG. 4.

FIG. 4 illustrates the envelopes of the waveforms of signals that are transmitted from the first to fourth semiconductor devices 303 to 306 to the communication device 302. A first communication signal waveform 401 represents the envelope of the waveform of a communication signal when all of the first to fourth semiconductor devices 303 to 306 are operating normally. A second communication signal waveform 402 represents the envelope of the waveform of a communication signal when the second semiconductor device 304 and the third semiconductor device 305 malfunction due to mechanical or electrical breakdown. In each of a first period 403 and a second period 404, "L" or "H" is transmitted as normal data. In a (1-1)th period 405 to a (1-4)th period 408, the processing data of each of the first to fourth semiconductor devices 303 to 306 in FIG. 3 is transmitted. In a (2-1)th period 409 to a (2-4)th period 412, the processing data of each of the first to fourth semiconductor devices 303 to 306 in FIG. 3 is transmitted. Although this embodiment illustrates the communication specification in which the amplitude of the envelop of the communication signal waveform is either small or large when "L" or "H" is transmitted as the normal data, a different communication specification may be employed.

The communication method in this embodiment has a feature that the first to fourth processing data of the first to fourth semiconductor devices 303 to 306, respectively are sequentially transmitted in time series. That is, the first to fourth processing data of the first to fourth semiconductor devices 303 to 306, respectively are sequentially transmitted to the communication device 302 by a time-division system. The reason that the majority operation of the arithmetic processing circuit 321 can be easily carried out with such a communication method will be described below.

The first reason is that since the data is continuous in time series, the majority operation can be conducted in real time. That is, even when a larger number of semiconductor devices are used, the majority operation can be executed before the communication device 302 has received all of the processing data. For this reason, a dedicated buffer for storing data received is not necessary and, thus, the communication device can be provided at low cost. Further, the processing speed of the communication device is improved, resulting in improved performance of the wireless system 301.

The second reason is that in the case where all of the first to fourth semiconductor devices 303 to 306 are operating normally, the first communication signal waveform should be the one in the period 403 that has four continuous small amplitudes or the one in the period 404 that has four continuous large amplitudes. Therefore, by using an algorithm, which first inspects the presence of either of the two waveforms, for the majority operation of the arithmetic processing circuit 321, the majority processed data 324 can be easily obtained. Therefore, the processing speed of the communication device is improved, resulting in improved performance of the wireless system 301.

The third reason is that, based on the result of the majority operation for the processing data that has been received previously, the majority operation for the processing data that is received subsequently can be simplified. For example, since the second communication signal waveform in the period 403 differs from that in the case where all of the semiconductor devices are operating normally as described for the second reason, the majority operation should be further continued. Here, "L" is adopted since the processing data are "L," "L," "H," and "L." In addition, since the second communication signal waveform in the period 404 differs from that in the case where all of the semiconductor devices are operating normally as described for the second reason, the majority operation should be further continued. Here, "H" is adopted since the processing data are "H," "L," "H," and "H."

The result in the period 403 shows that the third processing data is an error, that is, the third semiconductor device 305 malfunctions due to mechanical or electrical breakdown.

Therefore, even when the majority operation in the period 204 is executed for the first processing data "H," the second processing data "L," and the fourth processing data "H" excluding the third processing data, a similar result can be obtained. That is, the processing speed of the communication device is improved, resulting in improved performance of the wireless system 301. Similarly, the result in the period 404 shows that the second processing data is also an error, that is, the second semiconductor device 304 malfunctions due to mechanical or electrical breakdown. Therefore, in the subsequent majority operation, only the first and fourth processing data should be inspected. That is, the processing speed of the communication device is improved, resulting in improved performance of the wireless system 301. Note that in this case, if both of the first and fourth processing data are normal, just the first processing data can be used as the majority processed data 324 without the majority operation. Thus, the processing speed of the communication device is improved, resulting in improved performance of the wireless system 301.

With the aforementioned configuration, a highly reliable wireless system can be provided in which, when one of the semiconductor devices malfunctions due to mechanical or electrical breakdown and cannot provide a normal processing result, a normal processing result can be obtained from the other semiconductor devices.

Embodiment 3

This embodiment will describe an exemplary method of fabricating the semiconductor device illustrated in the aforementioned embodiments. Described in this embodiment is a structure in which an antenna circuit and a semiconductor device are formed over the same substrate. Note that by forming the antenna circuit and the semiconductor device over the same substrate and using thin film transistors for transistors included in the semiconductor device, a compact semiconductor device can be provided.

First, as illustrated in FIG. 7A, a release layer 1903 is formed over one surface of a substrate 1901 with an insulating film 1902 interposed therebetween. Then, an insulating film 1904 serving as a base film and a semiconductor film 1905 (for example, a film containing amorphous silicon) are sequentially stacked over the release layer 1903. Note that the insulating film 1902, the release layer 1903, the insulating film 1904, and the semiconductor film 1905 can be formed consecutively.

Note that the substrate 1901 can be any of a glass substrate, a quartz substrate, a metal substrate (for example, a stainless steel substrate), a ceramic substrate, and a semiconductor substrate such as a Si substrate. Further, a plastic substrate made of polyethylene terephthalate (PET), polyethylene naphthalate (PEN), polyethersulfone (PES), or acrylic can also be used. Note that in the present step, the release layer 1903 is provided over the entire surface of the substrate 1901 with the insulating film 1902 interposed therebetween. However, it is also possible to provide a release layer over the entire surface of the substrate 1901 and selectively pattern the release layer by a lithography method or the like.

The insulating films 1902 and 1904 are each formed by a CVD method, a sputtering method, or the like using an insulating material such as silicon oxide, silicon nitride, silicon oxynitride ($SiO_xN_y$) (x>y>0), or silicon nitride oxide ($SiN_xO_y$) (x>y>0). For example, when the insulating films 1902 and 1904 are each formed with a two-layer structure, it is preferable to form a silicon nitride oxide film as a first insulating film and form a silicon oxynitride film as a second insulating film. Further, each of the insulating films 1902 and 1904 can also be formed by depositing a silicon nitride film as a first insulating film and depositing a silicon oxide film as a second insulating film. The insulating film 1902 serves as a blocking layer that prevents diffusion of impurity elements from the substrate 1901 to the releaser layer 1903 or to elements formed over the release layer 1903. The insulating film 1904 serves as a blocking layer that prevents diffusion of impurity elements from the substrate 1901 and the releaser layer 1903 to elements formed over the release layer 1903. Providing the insulating films 1902 and 1904 that serve as the blocking layers in this manner can prevent adverse effects of alkali metals such as Na or alkaline earth metals contained in the substrate 1901, or impurity elements contained in the release layer 1903, which would otherwise be diffused to the elements formed over the release layer 1903. Note that the insulating films 1902 and 1904 may be omitted when quartz is used for the substrate 1901, for example.

The release layer 1903 may be formed with a metal film, a stacked-layer structure of a metal film and a metal oxide film, and the like. In the case of using a metal film, an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or compound material containing such an element as a main component is stacked in either a single layer or stacked layers. Such materials can be deposited by a sputtering method, various CVD methods such as a plasma CVD method, or the like. The stacked-layer structure of a metal film and a metal oxide film may be formed by the steps of depositing the aforementioned metal film and applying plasma treatment under an oxygen atmosphere or an $N_2O$ atmosphere or applying thermal treatment under an oxygen atmosphere or an $N_2O$ atmosphere, so that oxide or oxynitride of the metal film can be provided on the surface of the metal film. For example, when a tungsten film is deposited as the metal film by a sputtering method, a CVD method, or the like, a metal oxide film made of tungsten oxide can be formed on the surface of the tungsten film by applying plasma treatment to the tungsten film. In this case, tungsten oxide is represented by $WO_x$ (x is 2 to 3). The value of x may be 2 ($WO_2$), 2.5 ($W_2O_5$), 2.75 ($W_4O_{11}$), 3 ($WO_3$), and the like. In forming the tungsten oxide, x is not limited to a specific value, and which oxide is to be formed may be determined based on the etching rate and the like. For the plasma treatment, high-density-plasma treatment may be used, for example. Further, in addition to the metal oxide film, metal nitride or metal oxynitride may also be used. In that case, plasma treatment or thermal treatment may be applied to the metal film under a nitrogen atmosphere or an atmosphere containing nitrogen and oxygen.

The semiconductor film 1905 is formed to a thickness of 25 to 200 nm (preferably, 30 to 150 nm) by a sputtering method, an LPCVD method, a plasma CVD method, or the like.

Next, as illustrated in FIG. 7B, the semiconductor film 1905 is irradiated with a laser beam to be crystallized. Note that crystallization of the semiconductor film 1905 may also be performed by combining laser irradiation with a thermal crystallization method that uses RTA or an annealing furnace or with a thermal crystallization method that uses a metal element for promoting crystallization. After that, the crystalline semiconductor film obtained is patterned into a desired shape by etching, so that crystalline semiconductor films 1905*a* to 1905*f* are formed. Then, a gate insulating film 1906 is formed to cover the crystalline semiconductor films 1905*a* to 1905*f*.

Note that the gate insulating film 1906 is formed by a CVD method, a sputtering method, or the like using an insulating material such as silicon oxide, silicon nitride, silicon oxynitride ($SiO_xN_y$) ($x>y>0$), or silicon nitride oxide ($SiN_xO_y$) ($x>y>0$). For example, when the gate insulating film 1906 is formed with a two-layer structure, it is preferable to form a silicon oxynitride film as a first insulating film and form a silicon nitride oxide film as a second insulating film. Further, the gate insulating film 1906 can also be formed by depositing a silicon oxide film as a first insulating film and depositing a silicon nitride film as a second insulating film.

A fabrication process of the crystalline semiconductor films 1905*a* to 1905*f* will be briefly described below. First, an amorphous semiconductor film with a thickness of 50 to 60 nm is deposited by a plasma CVD method. Then, a solution containing nickel that is a metal element for promoting crystallization is applied to and retained on the amorphous semiconductor film. Then, the amorphous semiconductor film is subjected to dehydrogenation treatment (500° C. for one hour) and thermal crystallization treatment (550° C. for four hours), so that a crystalline semiconductor film is obtained. After that, the crystalline semiconductor film is patterned into the crystalline semiconductor films 1905*a* to 1905*f* by a photolithography method using laser irradiation. Note that the crystallization of the amorphous semiconductor film may be carried out by only laser irradiation without the thermal crystallization that uses a metal element for promoting crystallization.

As a laser oscillator used for crystallization, either a continuous-wave laser (CW laser) or a pulsed laser can be used. Laser beams that can be used here include beams emitted from one or more kinds of the following lasers: a gas laser such as an Ar laser, a Kr laser, or an excimer laser; a laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium, and one or more of Nd, Yb, Cr, Ti, Ho, Er, Tm, and Ta is added thereto as a dopant; a glass laser; a ruby laser; an alexandrite laser; a Ti:sapphire laser; a copper vapor laser; and a gold vapor laser. Crystals with a large grain diameter can be obtained by irradiation with the fundamental wave of the above laser beam or the second harmonic to the fourth harmonic of the fundamental wave thereof. For example, the second harmonic (532 nm) or the third harmonic (355 nm) of a Nd:$YVO_4$ laser (the fundamental wave: 1064 nm) can be used. At this time, the power density of the laser needs to be about 0.01 to 100 $MW/cm^2$ (preferably, 0.1 to 10 $MW/cm^2$). The scanning rate is set to about 10 to 2000 cm/sec for irradiation. Note that the laser in which single-crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ is used as a medium and one or more of Nd, Yb, Cr, Ti, Ho, Er, Tm, and Ta is added thereto as a dopant; an Ar ion laser; or a Ti:sapphire laser can perform CW operation. Alternatively, it can also perform pulsed operation at a repetition rate of greater than or equal to 10 MHz by combining Q-switching operation, mode locking, or the like. When a laser beam is pulsed at a repetition rate of greater than or equal to 10 MHz, it is possible for a semiconductor film to be irradiated with the next pulse after it is melted by the previous laser beam and before it becomes solidified. Therefore, unlike the case of using a pulsed laser with a low repetition rate, a solid-liquid interface of the semiconductor film can be moved continuously. Thus, crystal grains that have grown continuously in the scanning direction can be obtained.

The gate insulating film 1906 may also be formed by oxidizing or nitriding the surfaces of the semiconductor films 1905*a* to 1905*f* by the aforementioned high-density-plasma treatment. For example, the gate insulating film 1906 is formed by plasma treatment with a mixed gas of a rare gas such as He, Ar, Kr, or Xe, and oxygen, nitrogen oxide ($NO_2$), ammonia, nitrogen, hydrogen, or the like. When plasma is excited by introduction of microwaves, plasma with a low electron temperature and high electron density can be generated. The surfaces of the semiconductor films can be oxidized or nitrided by oxygen radicals (there may also be OH radicals) or nitrogen radicals (there may also be NH radicals) that are generated by the high-density-plasma treatment.

By such high-density-plasma treatment, an insulating film with a thickness of 1 to 20 nm, typically 5 to 10 nm is formed on the semiconductor films. Since the reaction in this case is a solid-phase reaction, interface state density between the insulating film and the semiconductor films can be extremely low. Such high-density-plasma treatment directly oxidizes (or nitrides) the surfaces of the semiconductor films (crystalline silicon or polycrystalline silicon). Therefore, variations in thickness of the insulating film to be formed can be ideally quite small. In addition, since the crystal grain boundaries of crystalline silicon are not strongly oxidized, an excellent state is obtained. That is, by solid-phase oxidizing the surfaces of the semiconductor films by high-density-plasma treatment as described here, an insulating film with a uniform thickness and low interface state density can be formed without local oxidation reaction at the crystal grain boundaries.

Note that the gate insulating film 1906 may be formed using only an insulating film deposited by high-density-plasma treatment. Further, an insulating film such as silicon oxide, silicon oxynitride, or silicon nitride may be deposited thereon by a CVD method with plasma or thermal reaction. In any case, a transistor which includes an insulating film formed by high-density-plasma treatment in a part or the whole of its gate insulating film can have small variations in characteristics.

Further, the semiconductor films 1905*a* to 1905*f*, which are obtained by crystallizing a semiconductor film by irradiation with a continuous-wave laser beam or with a laser beam pulsed at a repetition rate of greater than or equal to 10 MHz while scanning in one direction, have a characteristic in having crystals that have grown in the beam scanning direction. When transistors are arranged such that their channel length directions (directions in which carriers flow when channel formation regions are formed) are disposed in the same direction as the scanning direction, and are combined with the aforementioned gate insulating layer, thin film transistors (TFTs) with small variations in characteristics and high electron field-effect mobility can be obtained.

Next, a first conductive film and a second conductive film are stacked over the gate insulating film 1906. Here, the first conductive film is formed to a thickness of 20 to 100 nm by a CVD method, a sputtering method, or the like. The second conductive film is formed to a thickness of 100 to 400 nm. Each of the first conductive film and the second conductive film is formed using an element selected from tantalum (Ta), tungsten (W), titanium (Ti), molybdenum (Mo), aluminum (Al), copper (Cu), chromium (Cr), niobium (Nb), or the like, or an alloy material or compound material containing such an element as a main component. Alternatively, a semiconductor material typified by polycrystalline silicon doped with an impurity element such as phosphorus may be used. Examples of the combination of the first conductive film and the second conductive film include a tantalum nitride film and a tungsten film; a tungsten nitride film and a tungsten film; and a molybdenum nitride film and a molybdenum film. Tungsten and tantalum nitride have high heat resistance. Therefore, when they are used for the first conductive film and the second conductive film, thermal treatment for thermal activation may be applied after the formation of the first conductive film and the second conductive film. In addition, when the gate insulating film 1906 is formed to have not a two-layer structure but a three-layer structure, a stacked-layer structure of a molybdenum film, an aluminum film, and a molybdenum film is preferably used.

Next, resist masks are formed by a photolithography method, and etching treatment for forming gate electrodes and gate lines is applied, so that gate electrodes 1907 are formed above the semiconductor films 1905a to 1905f. Illustrated here is an example in which each gate electrode 1907 has a stacked-layer structure of a first conductive film 1907a and a second conductive film 1907b.

Next, as illustrated in FIG. 7C, the semiconductor films 1905a to 1905f are doped with an n-type impurity element with the gate electrodes 1907 as masks, by an ion doping method or an ion implantation method so that the semiconductor films 1905a to 1905f contain the n-type impurity element at a low concentration. Then, resist masks are selectively formed by a photolithography method and the semiconductor films 1905c and 1905e are doped with a p-type impurity element so that the semiconductor films 1905c and 1905e contain the p-type impurity element at a high concentration. Examples of the n-type impurity element include phosphorus (P) and arsenic (As). Examples of the p-type impurity element include boron (B), aluminum (Al), and gallium (Ga). Here, phosphorus (P) is used as the n-type impurity element and selectively added to the semiconductor films 1905a to 1905f so that the semiconductor films 1905a to 1905f contain phosphorus at a concentration of $1 \times 10^{15}$ to $1 \times 10^{19}/cm^3$. Accordingly, n-type impurity regions 1908 are formed. In addition, boron (B) is used as the p-type impurity element and selectively added to the semiconductor films 1905c and 1905e so that the semiconductor films 1905c and 1905e contain boron at a concentration of $1 \times 10^{19}$ to $1 \times 10^{20}/cm^3$. Accordingly, p-type impurity regions 1909 are formed.

Next, an insulating film is formed to cover the gate insulating film 1906 and the gate electrodes 1907. The insulating film is formed by depositing a film containing an inorganic material such as silicon, silicon oxide, or silicon nitride, or a film containing an organic material such as an organic resin by a plasma CVD method, a sputtering method, or the like, and has a single-layer structure or a stacked-layer structure. Then, the insulating film is selectively etched by anisotropic etching (etching mainly in a perpendicular direction), so that insulating films (also referred to as sidewalls) 1910 that are in contact with the side surfaces of the gate electrodes 1907 are formed. The insulating films 1910 are used as doping masks for formation of LDD (lightly doped drain) regions.

Next, the semiconductor films 1905a, 1905b, 1905d, and 1905f are doped with an n-type impurity element, using resist masks formed by a photolithography method, the gate electrodes 1907, and the insulating films 1910 as masks, so that the semiconductor films 1905a, 1905b, 1905d, and 1905f contain the n-type impurity element at a high concentration. Accordingly, n-type impurity regions 1911 are formed. Here, phosphorus (P) is used as the n-type impurity element and selectively added to the semiconductor films 1905a, 1905b, 1905d, and 1905f so that the semiconductor films 1905a, 1905b, 1905d, and 1905f contain phosphorus at a concentration of $1 \times 10^{19}$ to $1 \times 10^{20}/cm^3$. Accordingly, the n-type impurity regions 1911 having a higher concentration of impurity than the impurity regions 1908 are formed.

Through the above steps, n-channel thin film transistors 1900a, 1900b, 1900d, and 1900f and p-channel thin film transistors 1900c and 1900e are formed as illustrated in FIG. 7D.

In the n-channel thin film transistor 1900a, a channel formation region is formed in a region of the semiconductor film 1905a which overlaps with the gate electrode 1907; the impurity regions 1911 that form a source region or a drain region are formed in regions which do not overlap with the gate electrode 1907 or the insulating films 1910; and lightly doped drain regions (LDD regions) are formed in regions which overlap with the insulating films 1910 and are located between the channel formation region and the impurity regions 1911. Similarly, the channel formation region, the lightly doped drain regions, and the impurity regions 1911 are also formed in the n-channel thin film transistors 1900b, 1900d, and 1900f.

In the p-channel thin film transistor 1900c, a channel formation region is formed in a region of the semiconductor film 1905c which overlaps with the gate electrode 1907, and the impurity regions 1909 that form a source region or a drain region are formed in regions which do not overlap with the gate electrode 1907. Similarly, the channel formation region and the impurity regions 1909 are also formed in the p-channel thin film transistor 1900e. Although LDD regions are not provided in the p-channel thin film transistors 1900c and 1900e here, the LDD regions may be provided in the p-channel thin film transistors. Also, the LDD regions are not necessarily provided in the n-channel thin film transistors.

Next, as illustrated in FIG. 8A, an insulating film with a single layer or stacked layers is formed to cover the semiconductor films 1905a to 1905f, the gate electrodes 1907, and the like. Then, conductive films 1913 are formed over the insulating film so as to be electrically connected to the impurity regions 1909 and 1911 that form the source region or the drain region of the thin film transistors 1900a to 1900f. The insulating film is formed in either a single layer or stacked layers, and formed by a CVD method, a sputtering method, an SOG method, a droplet discharge method, a screen printing method, or the like, using an inorganic material such as silicon oxide or silicon nitride; an organic material such as polyimide, polyamide, benzocyclobutene, acrylic, or epoxy; a siloxane material; and/or the like. Here, the insulating film is formed to have two layers. Specifically, a silicon nitride oxide film is formed as a first insulating film 1912a and a silicon oxynitride film is formed as a second insulating film 1912b. The conductive films 1913 form the source and drain electrodes of the semiconductor films 1905a to 1905f.

Note that before the formation of the insulating films 1912a and 1912b, or after the formation of one or both of the insulating films 1912a and 1912b, thermal treatment is preferably applied in order to recover the crystallinity of the semiconductor films, activate the impurity elements added to the semiconductor films, or hydrogenate the semiconductor films. The thermal treatment is preferably performed by thermal annealing, laser annealing, RTA, or the like.

The conductive films 1913 are each formed in a single layer or stacked layers by a CVD method, a sputtering method, or the like, using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or compound material containing such an element as a main component. An alloy material containing aluminum as a main component is, for example, an alloy material which contains aluminum as a main component and contains nickel, or an alloy material which contains aluminum as a main component and contains one or both of carbon and silicon. The conductive film 1913 preferably has a stacked-layer structure of, for example, a barrier film, an aluminum silicon (Al—Si) film, and a barrier film, or a stacked-layer structure of a barrier film, an aluminum silicon (Al—Si) film, a titanium nitride film, and a barrier film. Note that the barrier film corresponds to a thin film made of titanium, titanium nitride, molybdenum, or molybdenum nitride. Aluminum and aluminum silicon, which have low resistance values and are inexpensive, are the most suitable materials for forming the conductive film 1913. When barrier layers are provided as the top layer and the bottom layer of the conductive film 1913, generation of hillock of aluminum or aluminum silicon can be prevented. Further, when a barrier film made of titanium that is an element having a high reducing property is formed, even when there is a thin natural oxide film formed on the crystalline semiconductor film, the natural oxide film can be reduced, so that the conductive film 1913 can form a favorable contact with the crystalline semiconductor film.

Next, an insulating film 1914 is formed to cover the conductive films 1913, and conductive films 1915a and 1915b are formed over the insulating film 1914 so as to be electrically connected to the conductive films 1913 that form the source or drain electrodes of the semiconductor films 1905a and 1905f. In addition, conductive films 1916a and 1916b are formed to be electrically connected to the conductive films 1913 that form the source or drain electrodes of the semiconductor films 1905b and 1905e. Note that the conductive films 1915a and 1915b and the conductive films 1916a and 1916b may be formed with same material and at the same time. The conductive films 1915a and 1915b and the conductive films 1916a and 1916b can be formed using any of the materials described for the conductive films 1913.

Next, as illustrated in FIG. 8B, conductive films 1917a and 1917b that function as antennae are formed to be electrically connected to the conductive films 1916a and 1916b, respectively.

Note that the insulating film 1914 can be formed in either a single layer or stacked layers, and formed by depositing an insulating film containing oxygen or nitrogen, such as silicon oxide ($SiO_x$), silicon nitride ($SiN_x$), silicon oxynitride ($SiO_xN_y$) (x>y>0), or silicon nitride oxide ($SiN_xO_y$) (x>y>0); a film containing carbon such as DLC (diamond-like carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material is a material having a Si—O—Si bond. Siloxane has a skeletal structure with the bond of silicon (Si) and oxygen (O). As a substituent of siloxane, an organic group containing at least hydrogen (e.g., an alkyl group or aromatic hydrocarbon) is used. A fluoro group may also be used as the substituent. Alternatively, both an organic group containing at least hydrogen and a fluoro group may be used as the substituent.

The conductive films 1917a and 1917b are each formed by depositing a conducive material by a CVD method, a sputtering method, a printing method such as screen printing or gravure printing, a droplet discharge method, a dispenser method, a plating method, or the like. The conductive material can be an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or compound material containing such an element as a main component. The conductive films 1917a and 1917b may have either a single-layer structure or a stacked-layer structure.

When the conductive films 1917a and 1917b that function as the antennae are formed by a screen printing method, for example, conductive paste, in which conductive particles with a grain diameter of several nanometers to several tens of nanometers are diffused or dispersed in an organic resin, may be selectively printed. For the conductive particles, metal particles including at least one type of metal such as silver (Ag), gold (Au), copper (Cu), nickel (Ni), platinum (Pt), palladium (Pd), tantalum (Ta), molybdenum (Mo), and titanium (Ti); fine particles of silver halide; or dispersant nanoparticles can be used. In addition, for an organic resin included in the conductive paste, one or more of organic resins that function as a binder, a solvent, a dispersant, and a covering material for metal particles can be used. Typical examples of organic resins include an epoxy resin and a silicone resin. In addition, in forming the conductive film, baking is preferably performed after the conductive paste is pushed out. For example, in the case of using fine particles (for example, a grain diameter of greater than or equal to 1 nm and less than or equal to 100 nm) containing silver as a main component as a material for the conductive paste, the conductive film can be obtained by curing the conductive paste by baking at a temperature in the range of 150 to 300° C. In addition, fine particles containing solder or lead-free solder as a main component may be used, and in this case, fine particles with a grain diameter of less than or equal to 20 μm is preferably used. Solder and lead-free solder have an advantage that they are low in cost.

Next, as illustrated in FIG. 8C, an insulating film 1918 is formed to cover the conductive films 1917a and 1917b, and then a layer (hereinafter referred to as an "element formation layer 1919") that includes the thin film transistors 1900a to 1900f and the conductive films 1917a and 1917b is peeled off the substrate 1201. Here, the element formation layer 1919 is partly irradiated with laser beams (for example, UV rays), whereby openings are formed in regions excluding the thin film transistors 1900a to 1900f. After that, the element formation layer 1919 can be peeled off the substrate 1901 with a physical force. Note that before peeling the element formation layer 1919 off the substrate 1901, the release layer 1903 may be selectively removed by introducing an etchant into the openings formed. For the etchant, gas or liquid containing halogen fluoride or a halogen compound is used; for example, chlorine trifluoride ($ClF_3$) is used as a gas containing halogen fluoride. Then, the element formation layer 1919 is peeled off the substrate 1901. Note that the release layer 1903 does not have to be completely removed and may be partly left. Accordingly, consumption of the etchant can be suppressed, and the processing time required for removing the release layer can be short. In addition, after the release layer 1903 is removed, the element formation layer 1919 can be retained above the substrate 1901. Further, when the substrate 1901 that the element formation layer 1919 is peeled off is reused, reduction in cost can be achieved.

The insulating film 1918 can be formed in either a single layer or stacked layers, and formed by depositing an insulating film containing oxygen or nitrogen, such as silicon oxide ($SiO_x$), silicon nitride ($SiN_x$), silicon oxynitride ($SiO_xN_y$) (x>y>0), or silicon nitride oxide ($SiN_xO_y$) (x>y>0); a film containing carbon such as DLC (diamond-like carbon); an organic material such as epoxy, polyimide, polyamide, polyvinyl phenol, benzocyclobutene, or acrylic; or a siloxane material such as a siloxane resin, by a CVD method, a sputtering method, or the like.

In this embodiment, as illustrated in FIG. 9A, after the formation of the openings in the element formation layer 1919 by laser irradiation, a first sheet material 1920 is attached to one surface (a surface in which the insulating film 1918 is exposed) of the element formation layer 1919, and then the element formation layer 1919 is peeled off the substrate 1901.

Next, as illustrated in FIG. 9B, a second sheet material 1921 is attached to the other surface (a surface exposed by peeling) of the element formation layer 1919, and one or both of thermal treatment and pressure treatment is/are applied to fix the second sheet material 1921. A hot-melt film or the like can be used for each of the first sheet material 1920 and the second sheet material 1921.

For the first sheet material 1920 and the second sheet material 1921, a film on which antistatic treatment for preventing static electricity or the like has been applied (hereinafter referred to as an antistatic film) can also be used. Examples of the antistatic film include a film in which an antistatic material is dispersed in a resin and a film to which an antistatic material is attached. The film provided with an antistatic material can be a film with an antistatic material provided over one of its surfaces, or a film with an antistatic material provided over each of its surfaces. Concerning the film with an antistatic material provided over one of its surfaces, the film may be attached to the element formation layer 1919 so that the antistatic material is placed on the inner side of the film or the outer side of the film. The antistatic material may be provided over the entire surface of the film, or over a part of the film. Examples of the antistatic material include a metal, indium tin oxide (ITO), and a surfactant such as an amphoteric surfactant, a cationic surfactant, or a nonionic surfactant. In addition, as an antistatic material, a resin material which contains a cross-linked copolymer having a carboxyl group and a quaternary ammonium base on its side chain, or the like can be used. By attaching, mixing, or applying such a material to a film, an antistatic film can be formed. By sealing the element formation layer 1919 with the antistatic film, the semiconductor elements can be prevented from adverse effects such as external static electricity when dealt with as a commercial product.

Although this embodiment illustrates the case where the element formation layer 1919 is used after peeled off the substrate 1901, the release layer 1903 may be omitted so that the element formation layer 1919 is directly formed over the substrate 1901 and is used as a semiconductor device. Note that when an SOI (silicon on insulator) is used for the substrate 1901, a single-crystalline semiconductor film may be used as the semiconductor film, and in that case, time that would be required for crystallization of a semiconductor film can be saved.

Note that this embodiment can be combined with the technical features of the other embodiments in this specification. That is, with the semiconductor device in this embodiment, a highly reliable wireless system, semiconductor device, and communication device can be provided in which, when part of the functional circuits included in the semiconductor device malfunctions due to mechanical or electrical breakdown and cannot provide a normal processing result, processing results of the other functional circuits can be utilized. In addition, a highly reliable wireless system and a highly reliable communication device can be provided in which, when one semiconductor device malfunctions due to mechanical or electrical breakdown and cannot provide a normal processing result, a normal processing result can be obtained from the other semiconductor devices.

Embodiment 4

This embodiment will describe a method of fabricating a semiconductor device of the present invention, using transistors formed on a single-crystalline substrate. Transistors formed on a single-crystalline substrate can have suppressed variations in characteristics. Therefore, the number of transistors used for the semiconductor device can be suppressed.

First, as illustrated in FIG. 10A, element-isolation insulating films 2301 for electrically isolating semiconductor elements are formed in a semiconductor substrate 2300. The element-isolation insulating films 2301 can electrically isolate regions in which transistors are to be formed (element formation regions) 2302 and 2303.

The semiconductor substrate 2300 can be, for example, a single-crystalline silicon substrate having n-type or p-type conductivity, a compound semiconductor substrate (a GaAs substrate, InP substrate, GaN substrate, SiC substrate, sapphire substrate, ZnSe substrate, or the like), an SOI (silicon on insulator) substrate formed by a bonding method or a SIMOX (separation by implanted oxygen) method, or the like.

The element-isolation insulating films 2301 can be formed by using as appropriate a selective oxidation method (LOCOS: local oxidation of silicon), a trench isolation method, or the like.

This embodiment illustrates an example in which a single-crystalline silicon substrate having n-type conductivity is used for the semiconductor substrate 2300 and a p well 2304 is formed in the element formation region 2303. The p well 2304 formed in the element formation region 2303 of the semiconductor substrate 2300 can be formed by selectively doping the element formation region 2303 with a p-type impurity element. Examples of the p-type impurity element include boron (B), aluminum (Al), and gallium (Ga). In the case of using a semiconductor substrate having p-type conductivity for the semiconductor substrate 2300, an n well may be formed in the element formation region 2302 by selectively doping the element formation region 2302 with an n-type impurity element.

Note that in this embodiment, the element formation region 2302 is not doped with an impurity element because an n-type semiconductor substrate is used for the semiconductor substrate 2300; however, an n well may be formed in the element formation region 2302 by doping the element formation region 2302 with an n-type impurity element. Examples of the n-type impurity element include phosphorus (P) and arsenic (As).

Next, insulating films 2305 and 2306 are formed to cover the element formation regions 2302 and 2303, respectively, as illustrated in FIG. 10B. In this embodiment, the semiconductor substrate 2300 is thermally oxidized so that silicon oxide films formed on the element formation regions 2302 and 2303 are used as the insulating films 2305 and 2306, respectively. Further, after the formation of the silicon oxide films by thermal oxidation, nitridation treatment may be applied to nitride the surfaces of the silicon oxide films, so that a stacked-layer structure of a silicon oxide film and a silicon oxynitride film can be used for each of the insulating films 2305 and 2306.

Further, the insulating films 2305 to 2306 may also be formed by plasma treatment as described above. For example, by oxidizing or nitriding the surface of the semiconductor substrate 2300 by high-density-plasma treatment, silicon oxide ($SiO_x$) films or silicon nitride ($SiN_x$) films can be formed as the insulating films 2305 and 2306 in the element formation regions 2302 and 2303.

Next, as illustrated in FIG. 10C, a conductive film is formed to cover the insulating films 2305 and 2306. Here, an example is shown in which a conductive film 2307 and a conductive film 2308 are sequentially stacked as the conductive film. Needless to say, the conductive film may have a single-layer structure or a stacked-layer structure of more than two layers.

The conductive films 2307 and 2308 can be formed using an element selected from tantalum (Ta), tungsten (W), titanium (Ti), molybdenum (Mo), aluminum (Al), copper (Cu), chromium (Cr), niobium (Nb), or the like. Alternatively, the conductive films 2307 and 2308 can be formed using an alloy film or compound film which contains the above metal as a main component. Further, a semiconductor such as polycrystalline silicon, which is obtained by doping a semiconductor film with an impurity element that imparts conductivity such as phosphorus or the like, may be used. In this embodiment, the conductive film 2307 is formed using tantalum nitride, and the conductive film 2308 is formed using tungsten.

Figure 11A:
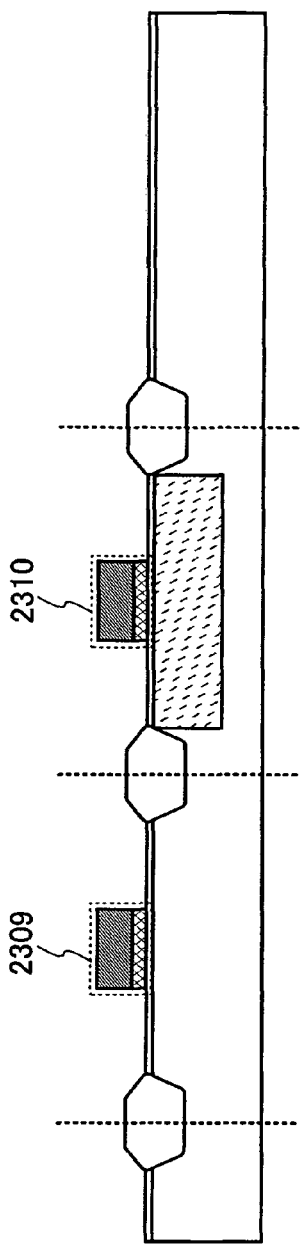
FIGS. 11A to 11C are cross-sectional views of the semiconductor device of the present invention.

Next, as illustrated in FIG. 11A, the conductive films 2307 and 2308 that are stacked are patterned into a predetermined shape, so that gate electrodes 2309 and 2310 are formed over the insulating films 2305 and 2306, respectively.

Figure 11B:
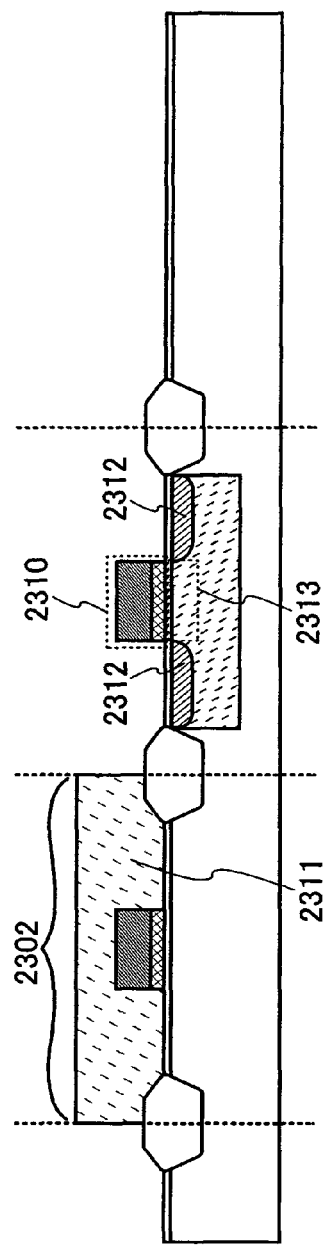

Next, as illustrated in FIG. 11B, a resist mask 2311 is selectively formed to cover the element formation region 2302. Then, the element formation region 2303 is doped with an impurity element with the gate electrode 2310 as well as the resist mask 2311 serving as a mask. Accordingly, impurity regions 2312 that function as source and drain regions and a channel formation region 2313 are formed in the p well 2304. An n-type impurity element or a p-type impurity element is used as the impurity element. Examples of the n-type impurity element include phosphorus (P) and arsenic (As). Examples of the p-type impurity element include boron (B), aluminum (Al), and gallium (Ga). Here, phosphorus (P) is used as the impurity element.

Figure 11C:
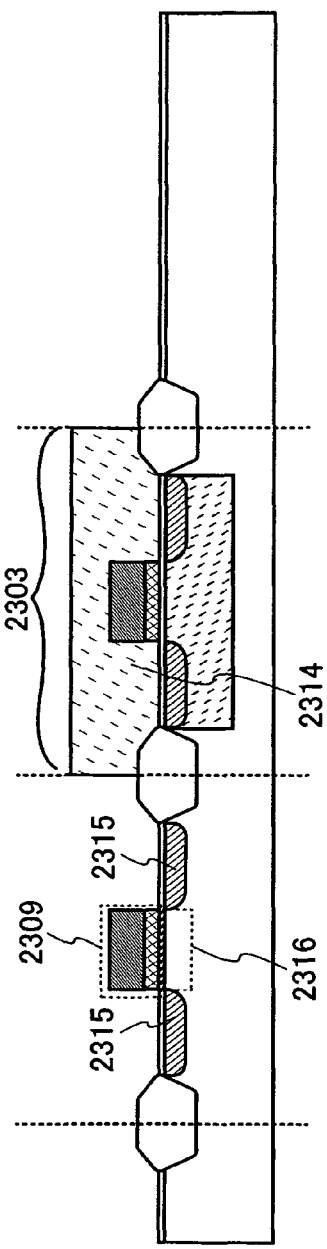

Next, the resist mask 2311 is removed and a resist mask 2314 is selectively formed to cover the element formation region 2303 as illustrated in FIG. 11C. Then, the element formation region 2302 is doped with an impurity element with the gate electrode 2309 as well as the resist mask 2314 serving as a mask. Accordingly, impurity regions 2315 that function as source and drain regions and a channel formation region 2316 are formed in the element formation region 2302 of the semiconductor substrate 2300. An n-type impurity element or a p-type impurity element is used as the impurity element. Examples of the n-type impurity element include phosphorus (P) and arsenic (As). Examples of the p-type impurity element include boron (B), aluminum (Al), and gallium (Ga). Here, an impurity element (for example, boron (B)) having an opposite conductivity type to the impurity element that has been added to the element formation region 2303 in FIG. 8C is used.

Next, as illustrated in FIG. 12A, an insulating film 2317 is formed to cover the insulating films 2305 and 2306 and the gate electrodes 2309 and 2310. Then, contact holes are formed in the insulating film 2317 to partly expose the impurity regions 2312 and 2315. Next, conducive films 2318 are formed to be connected to the impurity regions 2312 and 2315 through the contact holes. The conductive films 2318 can be formed by a CVD method, a sputtering method, or the like.

The insulating film 2317 can be formed using an inorganic insulating film, an organic resin film, or a siloxane-based insulating film. Examples of the inorganic insulating film include silicon oxide, silicon oxynitride, silicon nitride oxide, and a film containing carbon as typified by DLC (diamond-like carbon). Examples of the organic resin film include acrylic, epoxy, polyimide, polyamide, polyvinyl phenol, and benzocyclobutene. The insulating film 2317 can be formed by a CVD method, a sputtering method, a droplet discharge method, a printing method, or the like depending on a material used.

Note that the structures of the transistors used for the semiconductor device of the present invention are not limited to those illustrated in this embodiment. For example, an inversely staggered structure may be used.

Next, an interlayer film 2324 is formed as illustrated in FIG. 12B. Then, the interlayer film 2324 is etched to form a contact hole that partly exposes the conductive film 2318. The material of the interlayer film 2324 is not limited to resins, and another film such as a CVD oxide film can be used. However, resins are preferably used in terms of flatness. Further, when a photosensitive resin is used for the interlayer film 2324, the contact hole can be formed without etching. Next, a wiring 2325 is formed to be in contact with the conductive film 2318 through the contact hole.

Next, a conductive film 2326 that functions as an antenna is formed to be in contact with the wiring 2325. The conductive film 2326 can be formed using a metal selected from silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni). Alternatively, the conductive film 2326 can be formed using an alloy film or compound film which contains the above metal as a main component. The conductive film 2326 can be formed in either a single layer or stacked layers of the aforementioned film(s).

The conductive film 2326 can be formed by a CVD method, a sputtering method, a printing method such as screen printing or gravure printing, a droplet discharge method, a dispenser method, a plating method, a photolithography method, an evaporation method, or the like.

Although this embodiment has illustrated the example in which the antenna is formed over the same substrate as the semiconductor elements, the present invention is not limited to this structure. For example, after the formation of an integrated circuit having semiconductor elements, an antenna which is formed separately may be electrically connected to the integrated circuit. In that case, electrical connection between the antenna and the integrated circuit may be carried out by compression bonding with the use of an anisotropic conductive film (ACF), an anisotropic conductive paste, or the like. Further, connection may be carried out using a conductive adhesive such as a silver paste, a copper paste, or a carbon paste; soldering; or the like.

Note that this embodiment can be combined with the technical features of the other embodiments in this specification. That is, with the semiconductor device in this embodiment, a highly reliable wireless system, semiconductor device, and communication device can be provided in which, when part of the functional circuits included in the semiconductor device malfunctions due to mechanical or electrical breakdown and cannot provide a normal processing result, processing results of the other functional circuits can be utilized. In addition, a highly reliable wireless system and a highly reliable communication device can be provided in which, when one semiconductor device malfunctions due to mechanical or electrical breakdown and cannot provide a normal processing result, a normal processing result can be obtained from the other semiconductor devices.

Embodiment 5

This embodiment will describe examples of the application of the semiconductor device of the present invention. The semiconductor device of the present invention can be applied to electronic appliances including cameras such as video cameras or digital video cameras, computers, portable information terminals (e.g., mobile computers, mobile phones, portable game machines, or electronic books), and image reproducing devices provided with recording media (specifically, DVD (digital versatile disc) players). Further, the semiconductor device of the present invention can be used as a so-called IC label or IC card that is provided to bills, coins, securities, bearer bonds, documents (e.g., driver's licenses or resident's cards), packaging containers (e.g., wrapping paper or bottles), storage media (e.g., DVD software or video tapes), means of transportation (e.g., bicycles), personal belongings (e.g., shoes or glasses), foods, plants, animals, human bodies, clothing, everyday articles, or tags on goods such as electronic appliances or on bags.

"IC card" as referred to in this embodiment is a card which is formed by embedding a thin semiconductor device (an IC chip) in a plastic card so that the IC chip can store information. The semiconductor device of the present invention can be in various forms, and all semiconductor devices in label form can be referred to as IC labels.

This embodiment will describe examples of the application of an IC label or IC chip having the semiconductor device of the present invention, and examples of products to which the IC label or IC card is attached, with reference to FIGS. 13A to 13E.

Figure 13A:
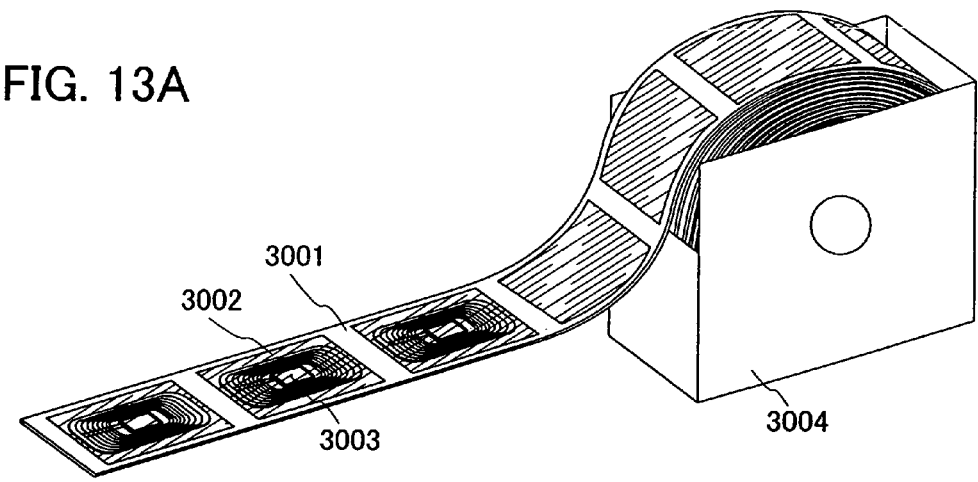
FIGS. 13A to 13E illustrate IC labels and IC cards that include the semiconductor devices of the present invention.

FIG. 13A shows an example of IC labels each including the semiconductor device of the present invention. A plurality of IC labels 3003 each including a semiconductor device 3002 is formed on a label board (separate paper) 3001. The IC labels 3003 are stored in a box 3004. In addition, on the IC label 3003, information about a product or service (a name of the product, brand, trademark, trademark owner, seller, manufacturer, or the like) is written, while an ID number that is unique to the product (or the type of the product) is assigned to the included semiconductor device to make it possible to easily detect forgery, infringement of intellectual property rights such as patent rights and trademark rights, and illegality such as unfair competition. In addition, a large amount of information that cannot be clearly written on a container of the product or the label (for example, the production area, selling area, quality, raw material, efficacy, use, quantity, shape, price, production method, usage, time of the production, time of use, expiration date, instructions for the product, information about the intellectual property of the product, or the like) can be input to the semiconductor device so that a client or a consumer can access the information by using a simple reader. Further, the semiconductor device is structured such that the producer of a product can easily rewrite or erase information, for example, but a client or a consumer cannot.

Figure 13B:
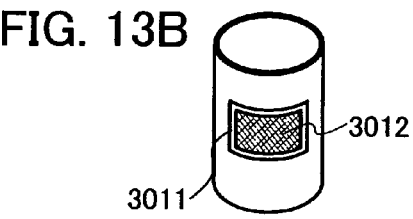

FIG. 13B shows a label-form IC label 3011 including a semiconductor device 3012 of the present invention. By providing a product with the IC label 3011, management of the product can be simplified. For example, in the case where a product is stolen, the product can be traced, so the culprit can be identified quickly. Thus, by providing the IC label, products that are superior in so-called traceability can be distributed.

Figure 13C:
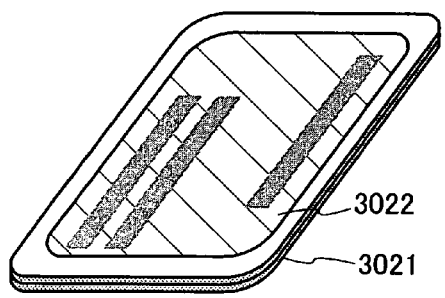

FIG. 13C shows an example of a completed IC card 3021 including a semiconductor device 3022 of the present invention. The IC card 3021 may be any kind of card, including a cash card, a credit card, a prepaid card, an electronic ticket, electronic money, a telephone card, and a membership card.

Figure 13D:
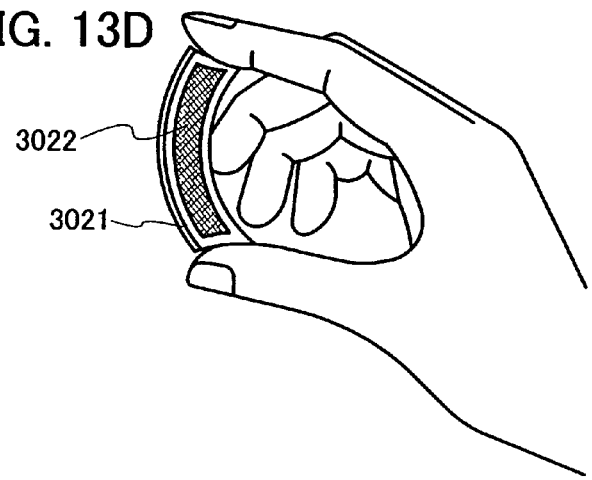

The IC card that includes the semiconductor device 3022 of the present invention as illustrated in FIG. 13C can be used even when the IC card is bent as shown in FIG. 13D. In the present invention, the semiconductor device 3022 can have a plurality of functional circuits as described in the aforementioned embodiments; therefore, the present invention is particularly effective when the semiconductor device 3022 is used in an environment that the semiconductor device 3022 can easily break down.

Figure 13E:
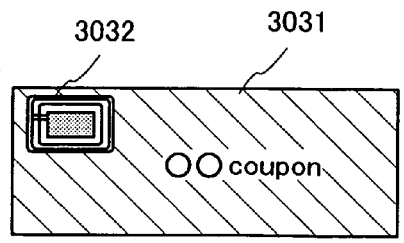

FIG. 13E shows an example of a completed bearer bond 3031. A semiconductor device 3032 is embedded in the bearer bond 3031 and is protected by a resin which forms the periphery of the semiconductor device. Here, the resin is filled with fillers. The bearer bond 3031 can be formed in the same manner as an IC label and IC card of the present invention. Note that examples of the bearer bond include, but not limited to, stamps, tickets, admission tickets, merchandise coupons, book coupons, stationery coupons, beer coupons, rice coupons, various types of gift coupons, and various types of service coupons. In addition, when the semiconductor device 3032 of the present invention is provided in bills, coins, securities, bearer bonds, documents, or the like, an authentication function can be provided. Therefore, by using the authentication function, forgery can be prevented.

As described above, the IC label or IC card that includes the semiconductor device of the present invention can be used by being attached to any goods (including living things).

Note that this embodiment can be combined with the technical features of the other embodiments in this specification. That is, with the semiconductor device in this embodiment, a highly reliable wireless system, semiconductor device, and communication device can be provided in which, when part of the functional circuits included in the semiconductor device malfunctions due to mechanical or electrical breakdown and cannot provide a normal processing result, processing results of the other functional circuits can be utilized. In addition, a highly reliable wireless system and a highly reliable communication device can be provided in which, when one semiconductor device malfunctions due to mechanical or electrical breakdown and cannot provide a normal processing result, a normal processing result can be obtained from the other semiconductor devices.

The present application is based on Japanese Priority Application No. 2007-024001 filed on Feb. 2, 2007 with the Japanese Patent Office, the entire contents of which are hereby incorporated by reference.

What is claimed is:

1. A wireless system comprising:
    a semiconductor device; and
    a communication device,
    wherein the semiconductor device comprises a first functional circuit and a second functional circuit,
    wherein the first functional circuit is configured to perform a first operation and to generate first data,
    wherein the second functional circuit is configured to perform a second operation and to generate second data,
    wherein the semiconductor device is configured to sequentially transmit the first data and the second data,
    wherein the communication device comprises an arithmetic processing circuit and is configured to receive the first data and the second data, and
    wherein the arithmetic processing circuit is configured to perform a majority operation on the first data and the second data.

2. The wireless system according to claim 1, wherein the communication device comprises a computing unit.

3. The wireless system according to claim 1, wherein the arithmetic processing circuit is connected to a server separate from the communication device.

4. A wireless system comprising:
    a first semiconductor device;

a second semiconductor device; and a communication device, wherein the first semiconductor device comprises a first functional circuit and is configured to transmit first data, wherein the first functional circuit is configured to perform a first operation and to generate the first data, wherein the second semiconductor device comprises a second functional circuit and is configured to transmit second data, wherein the second functional circuit is configured to perform a second operation and to generate the second data, wherein the communication device comprises an arithmetic processing circuit and configured to sequentially receive the first data and the second data, and wherein the arithmetic processing circuit is configured to perform a majority operation on the first data and the second data.

5. The wireless system according to claim 4, wherein the communication device comprises a computing unit.

6. The wireless system according to claim 4, wherein the arithmetic processing circuit is connected to a server separate from the communication device.

7. A semiconductor device comprising:

a first functional circuit;

a second functional circuit;

a controller; and a transmission/reception circuit, wherein the first functional circuit is configured to store first data, wherein the second functional circuit is configured to store second data, wherein the controller is configured to read the first data from the first functional circuit and the second data from the second functional circuit and to send the first data and the second data to the transmission/reception circuit, wherein the transmission/reception circuit is configured to sequentially transmit the first data and the second data to a communication device and to receive third data from the communication device, and wherein the communication device is configured to receive the first data and the second data and perform a majority operation on the first data and the second data.

8. The semiconductor device according to claim 7, wherein the communication device comprises a computing unit configured output the third data based on a result of the majority operation.

9. The semiconductor device according to claim 7, wherein the communication device is connected to a server that is separate from the communication device and configured to output the third data based on a result of the majority operation.

10. A communication device comprising:

a transmission/reception circuit; and an arithmetic processing circuit, wherein the transmission/reception circuit is configured to sequentially receive first data and second data transmitted from a semiconductor device and to transmit third data to the semiconductor device, and wherein the arithmetic processing circuit is configured to perform a majority operation on the first data and the second data.

11. The communication device according to claim 10, further comprising a computing unit configured to output the third data based on a result of the majority operation.

12. The communication device according to claim 10, wherein the arithmetic processing circuit is connected to a server that is separate from the communication device and configured to output the third data based on a result of the majority operation.

13. A communication device comprising:

a transmission/reception circuit; and an arithmetic processing circuit, wherein the transmission/reception circuit is configured to sequentially receive first data transmitted from a first semiconductor device and second data transmitted from a second semiconductor device and to transmit third data to the first semiconductor device and the second semiconductor device, and wherein the arithmetic processing circuit is configured to perform a majority operation on the first data and the second data.

14. The communication device according to claim 13, further comprising a computing unit configured to output the third data based on a result of the majority operation.

15. The communication device according to claim 13, wherein the arithmetic processing circuit is connected to a server that is separate from the communication device and configured to output the third data based on a result of the majority operation.

* * * * *

UNITED STATES PATENT AND TRADEMARK OFFICE
CERTIFICATE OF CORRECTION

PATENT NO. : 8,009,050 B2
APPLICATION NO. : 12/010789
DATED : August 30, 2011
INVENTOR(S) : Yoshiyuki Kurokawa It is certified that error appears in the above-identified patent and that said Letters Patent is hereby corrected as shown below:

IN THE SPECIFICATIONS:
At column 21, line 43, "SOT" should be --SOI--;

IN THE CLAIMS:
At column 27, lines 44 and 45, claim 8: "configured output" should be --configured to output--.

Signed and Sealed this
First Day of November, 2011

David J. Kappos
*Director of the United States Patent and Trademark Office*